United States Patent
Xu et al.

(10) Patent No.: US 11,971,985 B2
(45) Date of Patent: Apr. 30, 2024

(54) ADAPTIVE DETECTION OF SECURITY THREATS THROUGH RETRAINING OF COMPUTER-IMPLEMENTED MODELS

(71) Applicant: Abnormal Security Corporation, San Francisco, CA (US)

(72) Inventors: Lei Xu, New York, NY (US); Jeshua Alexis Bratman, New York, NY (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 17/871,765

(22) Filed: Jul. 22, 2022

(65) Prior Publication Data

US 2023/0039382 A1 Feb. 9, 2023

Related U.S. Application Data

(60) Provisional application No. 63/225,021, filed on Jul. 23, 2021.

(51) Int. Cl.
*G06F 21/55* (2013.01)

(52) U.S. Cl.
CPC ...... *G06F 21/554* (2013.01); *G06F 2221/031* (2013.01)

(58) Field of Classification Search
CPC ... G06F 21/56; G06F 21/629; G06F 2221/031
See application file for complete search history.

(56) References Cited

U.S. PATENT DOCUMENTS

| | | | |
|---|---|---|---|
| 10,404,745 B2* | 9/2019 | Verma | G06N 20/20 |
| 11,222,112 B1* | 1/2022 | Satpathy | G06N 20/00 |
| 2019/0199736 A1* | 6/2019 | Howard | H04L 63/1425 |
| 2019/0215329 A1* | 7/2019 | Levy | G06N 20/00 |
| 2020/0366712 A1* | 11/2020 | Onut | H04L 63/1425 |
| 2021/0352093 A1* | 11/2021 | Hassanzadeh | H04L 63/1416 |
| 2021/0406366 A1* | 12/2021 | Betser | G06F 21/554 |

OTHER PUBLICATIONS

Alsufyani et al., Social Engineering Attack Detection Using Machine Learning: Text Phishing Attack, Indian Journal of Computer Science and Engineering (IJCSE), 2021, pp. 743-751, vol. 12, No. 3.
Information Security Media Group, 'Multi-Channel Fraud: A Defense Plan', Retrieved on Apr. 18, 2021 (Apr. 18, 2021) from <https://www.bankInfosecurity.com/Interviews/multi-channel-fraud-defense-plan-i-1799>, Feb. 20, 2013, 9 pages.

(Continued)

*Primary Examiner* — Daniel B Potratz
(74) *Attorney, Agent, or Firm* — Van Pelt, Yi & James LLP

(57) ABSTRACT

Adapting detection of security threats, including by retraining computer-implemented models is disclosed. An indication is received that a natural language processing model should be retrained. A list of training samples is generated that includes at least one synthetic training sample. The natural language processing model is retrained at least in part by using the set of generated training samples. The retrained natural language processing model is used to determine a likelihood that a message poses a risk.

34 Claims, 13 Drawing Sheets

(56) References Cited

OTHER PUBLICATIONS

Lansley et al., SEADer: A Social Engineering Attack Detection Method Based on Natural Language Processing and Artificial Neural Networks, Nguyen, N., Chbeir, R., Exposito, E., Aniorté, P., Trawiński, B. (eds) Computational Collective Intelligence. ICCCI 2019. Lecture Notes in Computer Science(), 2019, vol. 11683.
Lansley et al., SEADer++: Social Engineering Attack Detection in Online Environments Using Machine Learning, Journal of Information and Telecommunication, 2020, pp. 346-362, vol. 4, No. 3.
Lauinger et al., Honeybot, Your Man in the Middle for Automated Social Engineering, LEET, Apr. 2010, pp. 1-8.
Proofpoint (Proofpoint Closed-Loop Email Analysis and Response, Aug. 2018, 2 pages) (Year: 2018).
Raskin et al., Ontological Semantic Technology for Detecting Insider Threat and Social Engineering, Proceedings of the 2010 New Security Paradigms Workshop, Sep. 2010, pp. 115-128.

\* cited by examiner

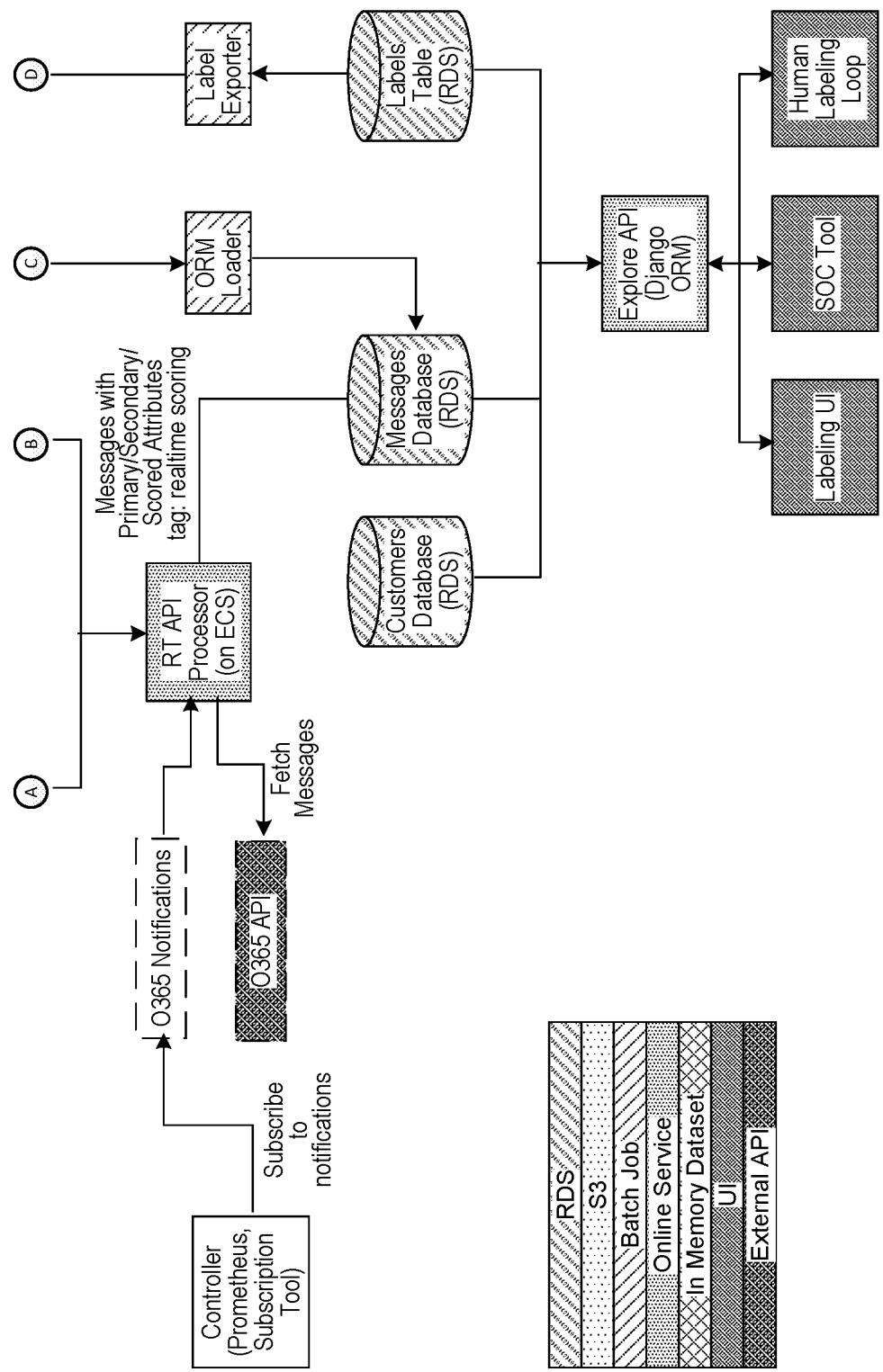
FIG. 1D, Cont.

ADAPTIVE DETECTION OF SECURITY THREATS THROUGH RETRAINING OF COMPUTER-IMPLEMENTED MODELS

CROSS REFERENCE TO OTHER APPLICATIONS

This application claims priority to U.S. Provisional Patent Application No. 63/225,021 entitled ADAPTIVE DETECTION OF SECURITY THREATS THROUGH RETRAINING OF COMPUTER-IMPLEMENTED MODELS filed Jul. 23, 2021 which is incorporated herein by reference for all purposes.

BACKGROUND OF THE INVENTION

Email connects millions of individuals in real time. Technological advancements have incentivized malicious actors (also referred to as "attackers") to send malicious emails in greater numbers than ever before. Because email now represents the primary communication channel for most enterprises (also referred to herein as "businesses," "companies," or "organizations"), it is a primary point of entry for attackers. Traditional techniques for securing email generally involve the use of defined rules for filtering malicious emails. Unfortunately, this approach is not effective at detecting novel attacks (e.g., ones that have not been observed before and for which no appropriate rules have been defined). Accordingly, there is an ongoing need to improve email security.

BRIEF DESCRIPTION OF THE DRAWINGS

Various embodiments of the invention are disclosed in the following detailed description and the accompanying drawings.

DETAILED DESCRIPTION

Figure 1A:
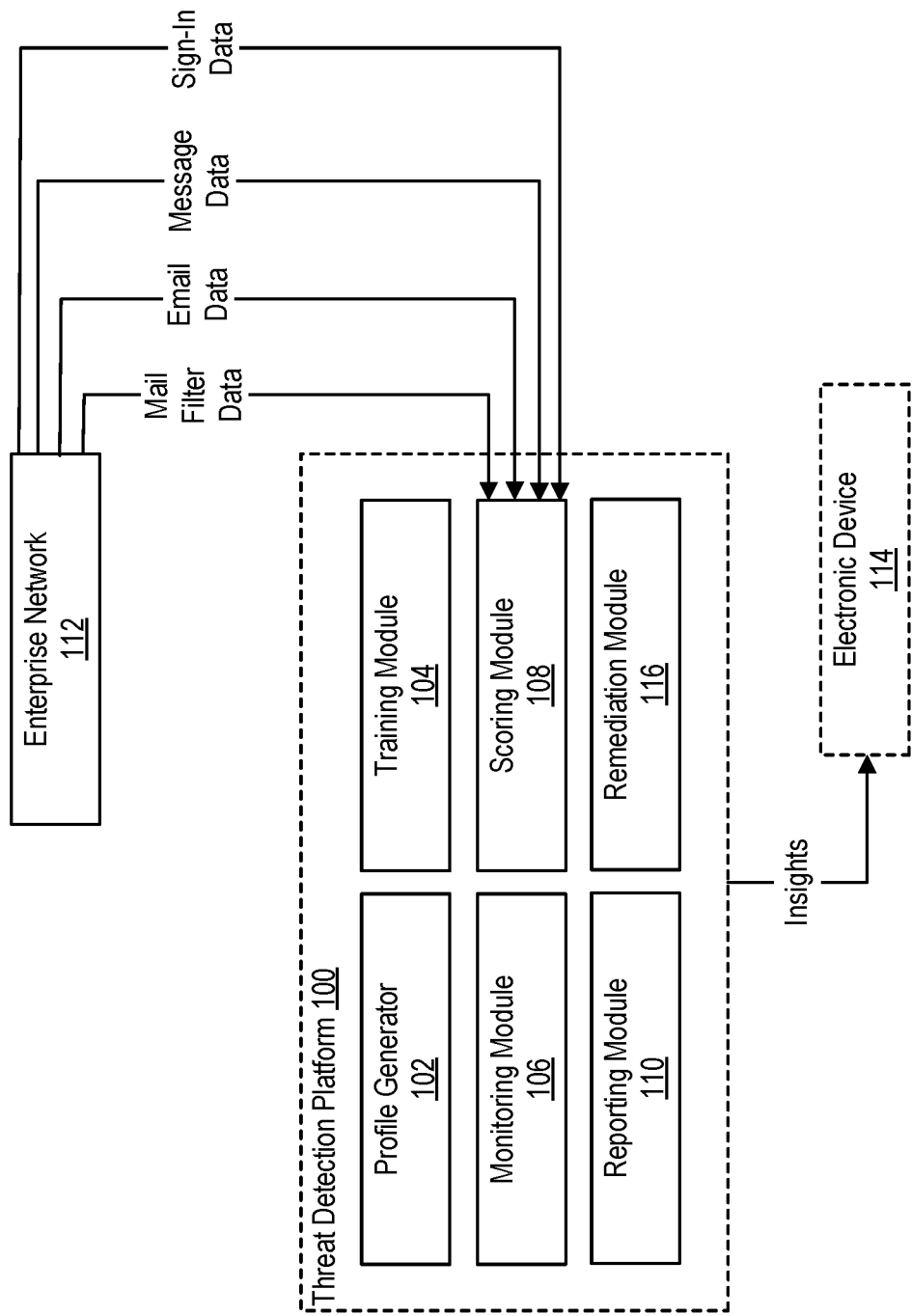
FIG. 1A depicts an example of a threat detection platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

Traditionally, enterprises protected themselves against threats by using secure email gateways (SEGs). At a high level, a SEG acts as a firewall by scanning incoming and outgoing emails—including attachments and Uniform Resource Locators (URLs)—to identify malicious content. For convenience, emails that include malicious content may be referred to as "malicious emails"). SEGs are able to provide pre-delivery protection by blocking malicious emails before those emails reach a mail server, regardless of whether the mail server is located on-premises or off-premises. The email server may be located off-premises if a collaboration suite (e.g., Microsoft Office® 365 or Google Workspace™) is responsible for handling email on behalf of the enterprise.

SEGs have historically been used to protect against malware and ransomware with significant success. Over the last several years, attempts have been made to develop additional defenses in an effort to protect against social engineering attacks. Examples of social engineering attacks include phishing and business email compromise (BEC) campaigns. For example, an enterprise may employ an identification scheme that examines the domain of incoming emails to identify those with domains that are similar but not identical to the enterprise. Thus, if the domain for the enterprise is ABC Company.com, the identification scheme could flag an email as possibly fraudulent in response to a determination that its domain is ABC-Company.com. As another example, an enterprise may employ a filter that quarantines emails originating from domains on a blacklist.

Unfortunately, these conventional defenses are largely ineffective against novel threats. Suppose, for example, that over a short interval of time (e.g., several hours or days), employees of multiple enterprises receive comparable malicious emails threatening, for example, disclosure of sensitive personal or financial information as part of a coordinated campaign. Conventional defenses would be unable to stop the coordinated campaign if the pattern of malicious emails had not been observed before. Introduced herein are approaches to autonomously training computer-implemented models (also referred to herein as "models") to provide for rapid detection of new types of email-based attacks. A real-world example of such a scenario is as follows: On Oct. 21, 2020 (two weeks before the U.S. general election), many voters in Florida received ominous emails that included some personal information (e.g., an address or phone number) and threatened violence if the recipient did not vote in a particular way. The emails implied that the sender had access to voting infrastructure which would reveal to the attacker how an individual voted. While the claim is exceedingly unlikely to be true, as with other exploitation attacks, inclusion of even a small amount of personal information increases the likelihood that a victim will believe outlandish claims. Existing email security systems were unable to stop the attack because the pattern had not been seen before. Using techniques described herein, however, examples of such an attack can be efficiently and quickly incorporated into natural language processing (NLP) or other applicable models, minimizing the harm posed by such malicious emails.

The above-mentioned example represents one of the most difficult challenges in building an effective system for preventing email-based attacks: the quickly changing and adversarial nature of the problem. Attackers are constantly innovating, not only launching new attack campaigns but also adjusting the language and social engineering strategies they employ to convince victims to provide login credentials, install malware, transfer funds to a fraudulent bank account, etc.

As further discussed below, various embodiments of a threat detection platform can apply one or more models to incoming emails to quantify the risk posed to the security of an enterprise in near real time. These models can examine the context and content of incoming emails to determine whether any of those emails are representative of a business email compromise (BEC), phishing, spamming, etc. In order to protect against novel threats, the models can be consistently trained (and re-trained) using up-to-date information. This information can include insights gained by the threat detection platform and/or insights provided by other entities, such as third party services or individuals. Examples of these individuals include researchers, security operations center (SOC) analysts, information technology (IT) professionals, and end users (e.g., reporting false negatives to the threat detection platform). Regardless of its source, the information can be collected and then provided, as input, to a pipeline for retraining models (e.g., rapidly retraining an NLP pipeline). The term "pipeline," as used herein, generally refers to a series of steps that—when performed in sequence—automate a retraining process by processing, filtering, extracting, or transforming the information and then using the information to retrain the models used by the threat detection platform.

Embodiments are described herein with reference to certain types of attacks. The features of those embodiments can similarly be applied to other types of attacks. As an example, while embodiments may be described in the context of retraining models to identify never-before-seen phishing attacks, a threat detection platform can also rapidly train its models to identify never-before-seen spamming attacks or spoofing attacks. Moreover, embodiments may be described in the context of certain types of digital activities. The features of those embodiments can similarly be applied to other types of digital activities. Thus, while an embodiment may be described in the context of examining emails, a threat detection platform can additionally or alternatively be configured to examine messages, mail filters, sign-in events, etc.

While embodiments may be described in the context of computer-executable instructions, aspects of the technology described herein can be implemented via hardware, firmware, or software. As an example, aspects of the threat detection platform can be embodied as instruction sets that are executable by a computer program that offers support for discovering, classifying, and then remediating threats to the security of an enterprise.

References in this description to "an embodiment" or "one embodiment" mean that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," and/or variants thereof are intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers to software components, firmware components, or hardware components. Modules are typically functional components that generate one or more outputs based on one or more inputs. As an example, a computer program may include multiple modules responsible for completing different tasks or a single module responsible for completing all tasks. Unless otherwise specified, an example way of implementing a module referred to herein is as a set of one or more python scripts which may make use of various publicly available libraries, toolkits, etc.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

II. Threat Detection Platform

FIG. 1A depicts an example of a threat detection platform that is configured to examine the digital conduct of accounts associated with employees to detect threats to the security of an enterprise. Accounts are digital profiles with which employees can engage in digital activities. These digital profiles are typically used to perform activities such as exchanging emails and messages, and thus may also be referred to as "email accounts" or "messaging accounts" herein. "Digital conduct" refers to the digital activities that are performed with those accounts. Examples of digital activities include transmitting and receiving communications; creating, modifying, and deleting filters to be applied to incoming communications; initiating sign-in activities; and the like. Examples of communications include emails and messages. As shown in FIG. 1A, threat detection platform 100 includes a profile generator 102, a training module 104, a monitoring module 106, a scoring module 108, a reporting module 110, and a remediation module 116. Some embodiments of threat detection platform 100 include a subset of these components, while other embodiments of the threat detection platform 100 include additional components that are not shown in FIG. 1A.

At a high level, threat detection platform 100 can acquire data related to digital conduct of accounts associated with employees and then determine, based on an analysis of the data, how to handle security threats in a targeted manner. Examples of such data include information related to emails, messages, mail filters, and sign-in activities. As further discussed below, these data are not necessarily obtained from the same source. As an example, data related to emails can be acquired from an email service (e.g., Microsoft Office 365) while data related to messages may be acquired from a messaging service (e.g., Slack). Threat detection platform 100 can identify security threats based on an analysis of incoming emails (e.g., the content of the body, the email address of the sender, etc.), metadata accompanying the incoming emails (e.g., information regarding the sender, recipient, origin, time of transmission, etc.), attachments, links, and/or other suitable data.

Threat detection platform 100 can be implemented, partially or entirely, within an enterprise network 112, a remote computing environment (e.g., through which the data regarding digital conduct is routed for analysis), a gateway, or another suitable location or combinations thereof. The remote computing environment can belong to, or be managed by, the enterprise or another entity. In some embodiments, threat detection platform 100 is integrated into the enterprise's email system (e.g., at a secure email gateway (SEG)) as part of an inline deployment. In other embodiments, threat detection platform 100 is integrated into the enterprise's email system via an application programming interface (API) such as the Microsoft Outlook API. In such embodiments, the threat detection platform 100 can obtain data via the API. Threat detection platform 100 can thus supplement and/or supplant other security products employed by the enterprise.

In some embodiments, threat detection platform 100 is maintained by a threat service (also referred to herein as a "security service") that has access to multiple enterprises' data. In this scenario, threat detection platform 100 can route data that is, for example, related to incoming emails to a computing environment managed by the security service. An example of such a computing environment is as one or more instances on Amazon Web Services (AWS). Threat detection platform 100 can maintain one or more databases for each enterprise it services that include, for example, organizational charts (and/or other user/group identifiers/memberships, indicating information such as "Alice is a member of the Engineering group" and "Bob is a member of the Marketing group"), attribute baselines, communication patterns, etc. Additionally or alternatively, threat detection platform 100 can maintain federated databases that are shared among multiple entities. Examples of federated databases include databases specifying vendors and/or individuals who have been deemed fraudulent, domains from which incoming emails determined to represent security threats originated, etc. The security service can maintain different instances of threat detection platform 100 for different enterprises, or the security service may maintain a single instance of threat detection platform 100 for multiple enterprises, as applicable. The data hosted in these instances can be obfuscated, encrypted, hashed, depersonalized (e.g., by removing personal identifying information), or otherwise secured or secreted as applicable. Accordingly, in various embodiments, each instance of threat detection platform 100 is able to access/process data related to the accounts associated with the corresponding enterprise(s).

In some embodiments, threat detection platform 100 is maintained by the enterprise whose accounts are being monitored—either remotely or on premises. In this scenario, all relevant data is hosted by the enterprise itself, and any information to be shared across multiple enterprises (if applicable) can be transmitted to a computing system that is maintained by the security service or a third party, as applicable.

As shown in FIG. 1A, profile generator 102, training module 104, monitoring module 106, scoring module 108, reporting module 110, and remediation module 116 can be integral parts of the threat detection platform 100. Alternatively, these components can be implemented individually, or in various combinations, while operating "alongside" threat detection platform 100. For example, reporting module 110 can be implemented in a remote computing environment to which the threat detection platform 100 is communicatively connected across a network. As mentioned above, threat detection platform 100 can be implemented by a security service on behalf of an enterprise or the enterprise itself. In some embodiments, aspects of threat detection platform 100 are provided by a web-accessible computer program operating on a computer server or a distributed computing system. For example, an individual can interface with threat detection platform 100 through a web browser that is executing on an electronic computing device (also referred to herein as an "electronic device" or "computing device" 114).

Enterprise network 112 can be a mobile network, wired network, wireless network, or some other communication network (or multiple of any/all of such networks) maintained by the enterprise or an operator on behalf of the enterprise. As noted above, the enterprise can use a security service to examine communications (among other things) to discover potential security threats. The enterprise may grant permission to the security service to monitor the enterprise network 112 by examining emails (e.g., incoming emails and/or outgoing emails) and then handling those emails that represent security threats. For example, threat detection platform 100 can be permitted to remediate threats posed by those emails (e.g., by using an API made available by an email service provider such as a cloud-based email service provider to move or delete such messages), or the threat detection platform 100 may be permitted to surface notifications regarding the threats posed by those emails (and/or that a recipient or sender account is likely to have been compromised, etc.), or combinations thereof. In some embodiments, the enterprise further grants permission to the security service to obtain data regarding other digital activities involving the enterprise (and, more specifically, employees of the enterprise) in order to build a profile that specifies communication patterns, behavioral traits, normal context of emails, normal content of emails, etc. For example, threat detection platform 100 may identify the filters that have been created and/or destroyed by each employee to infer whether any significant variations in behavior have occurred. Such filters may comprise rules manually specified by the user (e.g., by the user explicitly interacting with tools made available by an email service) and/or may also be inferred based on users' interactions with their mail (e.g., by obtaining from the email service log data indicating which messages the user has moved from an inbox to a folder, or vice versa). As another example, threat detection platform 100 may examine the emails or messages received by a given employee to establish the characteristics of normal communications (and thus be able to identify abnormal communications).

Threat detection platform 100 can manage one or more databases in which data can be stored. Examples of such data include enterprise data (e.g., email data, message data, sign-in data, and mail filter data), remediation policies, communication patterns, behavioral traits, etc. The data stored in the database(s) can be determined by threat detection platform 100 (e.g., learned from data available on enterprise network 112), provided by the enterprise, or retrieved from an external database (e.g., associated with LinkedIn, Microsoft Office 365, or G Suite) as applicable. Threat detection platform 100 can also store outputs produced by the various modules, including machine- and human-readable information regarding insights into threats and any remediation actions that were taken.

As shown in FIG. 1A, threat detection platform 100 includes a profile generator 102 that is responsible for generating one or more profiles for the enterprise. For example, profile generator 102 can generate a separate profile for each account associated with an employee of the enterprise based on sign-in data, message data, email data, and/or mail filter data, etc. Additionally or alternatively, profiles can be generated for business groups, organizational groups, or the enterprise as a whole. By examining data obtained from enterprise network 112, profile generator 102 can discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates, etc.), etc. This information can be populated into the profiles so that each profile can be used as a baseline for what constitutes normal activity by the corresponding account (or group of accounts).

An example profile includes a number of behavioral traits associated with a given corresponding account. For example, profile generator 102 can determine behavioral traits based on sign-in data, message data, email data, and/or mail filter data obtained from enterprise network 112 or another source (e.g., a collaboration suite via an API). Email data can include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. Profile generator 102 can use the aforementioned information to build a profile for each email account that represents a model of normal behavior of the corresponding employee. As further discussed below, the profiles can be helpful in identifying the digital activities and communications that indicate that a security threat may exist.

Monitoring module 106 is responsible for monitoring communications (e.g., messages and emails) handled by the enterprise network 112. These communications can include incoming emails (e.g., external and internal emails) received by accounts associated with employees of the enterprise, outgoing emails (e.g., external and internal emails) transmitted by those accounts, and messages exchanged between those accounts. In some embodiments, monitoring module 106 is able to monitor incoming emails in near real time so that appropriate action can be taken, in a timely fashion, if a malicious email is discovered. For example, if an incoming email is determined to be representative of a phishing attack (e.g., based on an output produced by scoring module 108), the incoming email can be prevented from reaching its intended destination by the monitoring module 106 or another applicable component or set of components. In some embodiments, monitoring module 106 is able to monitor communications only upon threat detection platform 100 being granted permission by the enterprise (and thus given access to enterprise network 112).

Scoring module 108 is responsible for examining digital activities and communications to determine the likelihood that a security threat exists. For example, scoring module 108 can examine each incoming email to determine how its characteristics compare to past emails sent by the sender and/or received by the intended recipient. In various embodiments, scoring module 108 may determine whether characteristics such as timing, formatting, and location of origination (e.g., in terms of sender email address or geographical location) match a pattern of past emails that have been determined to be non-malicious. For example, scoring module 108 may determine that an email is likely to be malicious if the sender email address ("support-xyz@gmail.com") differs from an email address ("John.Doe@CompanyABC.com") that is known to be associated with the alleged sender ("John Doe"). As another example, scoring module 108 may determine that an account may have been compromised if the account performs a sign-in activity that is impossible or improbable given its most recent sign-in activity (e.g., the user logs in from Germany ten minutes after having logged in from California, or a user that typically accesses email from 9 am-5 pm on weekdays begins accessing email on weekends at 3 am).

Scoring module 108 can make use of heuristics, rules, neural networks, or other trained machine learning (ML) approaches such as decision trees (e.g., gradient-boosted decision trees), logistic regression, linear regression, or other appropriate techniques. Scoring module 108 can output discrete outputs or continuous outputs, such as a probability metric (e.g., specifying the likelihood that an incoming email is malicious), a binary output (e.g., malicious or not malicious), or a sub-classification (e.g., specifying the type of malicious email). Further, scoring module 108 can rank or otherwise generate a prioritized list of the top features, facets, or combinations thereof that result in a particular message being identified as posing a security threat. In various embodiments, scoring module 108 executes a topic inference module. The topic inference module can be used to identify topics of digital communications. Assume, for example, that scoring module 108 is tasked with quantifying risk posed by an incoming email. In that situation, the topic inference module may identify one or more topics based on an analysis of the incoming email, its metadata, or information derived by the scoring module.

These topics may be helpful in conveying the risk and relevance of the incoming email and for other purposes.

Reporting module 110 is responsible for reporting insights derived from outputs produced by scoring module 108 in various embodiments (e.g., as a notification summarizing types of threats discovered or other applicable output). For example, reporting module 110 can provide a summary of the threats discovered by scoring module 108 to an electronic device 114. Electronic device 114 may be managed by the employee associated with the account under examination, an individual associated with the enterprise (e.g., a member of the information technology (IT) department), or an individual associated with a security service, etc. Reporting module 110 can surface these insights in a human-readable format for display on an interface accessible via the electronic device 114. Such insights can be used to improve the overall security position of the enterprise, by providing specific, concrete reasons why particular communications are problematic to security personnel (or other appropriate individuals, such as end users).

Remediation module 116 can perform one or more remediation actions in response to scoring module 108 determining that an incoming email is likely representative of a threat. The types of remediation that can be taken can be based on the nature of the threat (e.g., its severity, the type of threat posed, the user(s) implicated in the threat, etc.), policies implemented by the enterprise, etc. Such policies can be predefined or dynamically generated based on inference, analysis, and/or the data obtained from enterprise network 112. Additionally or alternatively, remediation action(s) can be based on the outputs produced by the models employed by the various modules. Examples of remediation actions include transferring suspect emails to another folder such as a quarantine folder, generating an alert (e.g., to an administrator or to the user), etc.

Various embodiments of threat detection platform 100 include a training module 104 that operates to train the models employed by other modules. As an example, training module 104 can train the models applied by the scoring module 108 to the sign-in data, message data, email data, and/or mail filter data, etc., by feeding training data into those models. Example training data includes emails that have been labeled as malicious or non-malicious, policies related to attributes of emails (e.g., specifying that emails originating from certain domains should not be considered malicious), etc. The training data can be employee, group, enterprise, industry, or nationality specific so that the model(s) are able to perform personalized analysis. In some embodiments, the training data ingested by the model(s) includes emails that are known to be representative of malicious emails sent as part of an attack campaign. These emails may have been labeled as such during a training process, or these emails may have been labeled as such by other employees.

Training module 104 can implement a retraining pipeline (also referred to herein as a "pipeline") in order to protect against novel threats as further discussed below. At a high level, the pipeline corresponds to a series of steps that, when executed by the training module 104, cause the models employed by the scoring module 108 to be retrained. By consistently training models using up-to-date information, the threat detection platform 100 can protect against novel threats that would otherwise escape detection.

Unlike conventional email filtering services, a threat detection platform (e.g., threat detection platform 100) can be completely integrated within an enterprise environment. For example, threat detection platform 100 can receive input indicative of an approval by an individual (e.g., an administrator associated with the enterprise or an administrator of the email service employed by the enterprise) to access email, active directory, mail groups, identity security events, risk events, documents, etc. The approval can be given through an interface generated by the threat detection platform. For example, the individual can access the interface generated by the threat detection platform and then approve access to these resources as part of a registration process.

Upon receiving the input, the threat detection platform can establish a connection with storage medium(s) that include these resources via application programming interface(s) (APIs). For example, the threat detection platform may establish, via an API, a connection with a computer server managed by the enterprise or some other entity on behalf of the enterprise.

The threat detection platform can then download resources from the storage medium(s) to build an ML model that can be used to identify email-based security threats. The threat detection platform can build an ML model based on retrospective information in order to better identify security threats in real time as emails are received. For example, threat detection platform 100 can ingest incoming emails and/or outgoing emails corresponding to the last six months, and then build an ML model that understands the norms of communication with internal contacts (e.g., other employees) and/or external contacts (e.g., vendors) for the enterprise.

Such an approach allows the threat detection platform to employ an effective ML model nearly immediately upon receiving approval from the enterprise to deploy it. Most standard integration solutions, such as anti-spam filters, will only have access going forward in time (i.e., after receiving the approval). Here, however, threat detection platform 100 can employ a backward-looking approach to develop personalized ML model(s) that are effective immediately. Moreover, such an approach allows the threat detection platform to go through a repository of past emails to identify security threats residing in employees' inboxes.

The aforementioned API-based approach provides a consistent, standard way of looking at all email handled by an enterprise (or another entity, such as an email service, on behalf of the enterprise). This includes internal-to-internal email that is invisible from standard integration solutions. A SEG integration, for example, that occurs through the mail exchanger (MX) record will only be able to see incoming email arriving from an external source. The only way to make email arriving from an internal source visible to the SEG integration would be to externally reroute the email through the gateway.

Figure 1B:
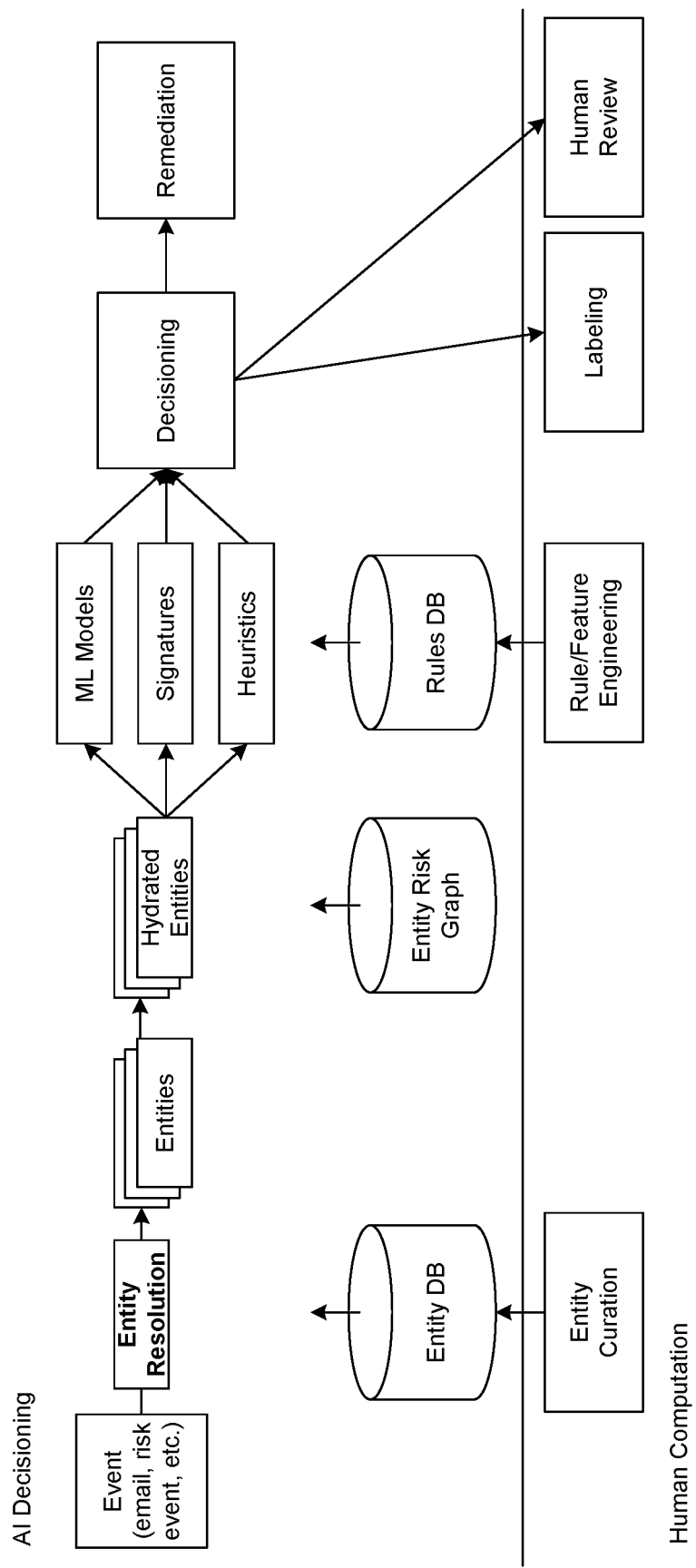
FIG. 1B depicts an example of a detection architecture of a threat detection platform.

FIG. 1B includes a high-level illustration of a detection architecture of a threat detection platform in accordance with some embodiments. Initially, the threat detection platform will determine that an event has occurred or is presently occurring. One example of an event is the receipt of an incoming email. As discussed above, the threat detection platform can be programmatically integrated with an email service employed by an enterprise so that all external emails (e.g., those received from an external email address and/or those transmitted to an external email address) and/or all internal emails (e.g., those sent from one employee to another employee) are routed through the threat detection platform for examination.

Then, the threat detection platform will perform an entity resolution procedure in order to identify the entities involved in the event. In some embodiments, the entity resolution procedure is a multi-step process.

First, threat detection platform 100 will acquire information regarding the event. For example, if the event is the receipt of an incoming email, the threat detection platform can examine the incoming email to identify the origin, sender identity, sender email address, recipient identity, recipient email address, subject, header(s), body content, etc. Moreover, the threat detection platform can determine whether the incoming email includes any links, attachments, etc.

Figure 1C:
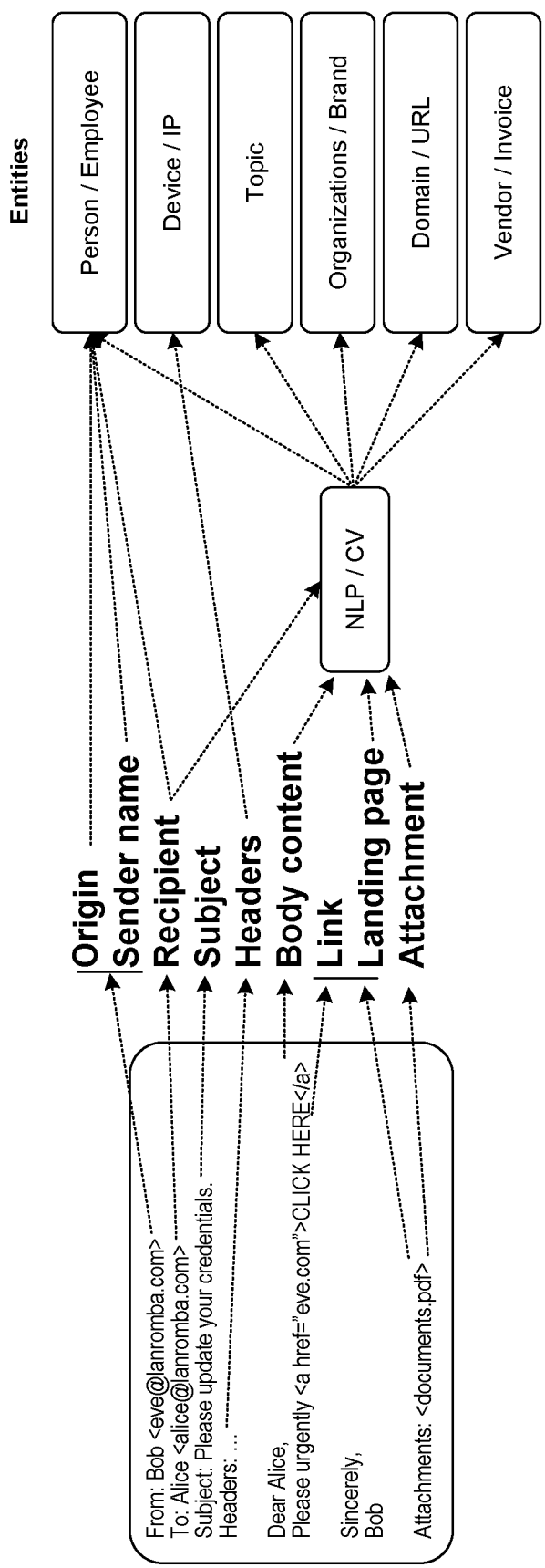
FIG. 1C depicts how information obtained from an email can be used to establish different features.

Second, threat detection platform 100 will resolve the entities involved in the event by examining the acquired information. FIG. 1C depicts how information obtained from an email can be used to establish different entities (also referred to as "features" or "attributes" of the incoming email). Some information may correspond directly to an entity. In the example of FIG. 1C, for example, the identity of the sender (or purported sender) may be established based on the origin or sender name. Other information may correspond indirectly to an entity. In the example of FIG. 1C, for example, the identity of the sender (or purported sender) may be established by applying a natural language processing (NLP) algorithm and/or computer vision (CV) algorithm to the subject, body content, etc. Entities may be established based on the incoming email, information derived from the incoming email, and/or metadata accompanying the incoming email.

In some embodiments, threat detection platform 100 will augment the acquired information with human-curated content. For example, feature(s) of an entity may be extracted from human-curated datasets of well-known brands, domains, etc. These human-curated datasets can be used to augment information gleaned from the enterprise's own datasets. Additionally or alternatively, humans can be responsible for labeling entities in some situations. For example, a human may be responsible for labeling landing pages and/or Uniform Resource Locators (URLs) of links found in incoming emails. Human involvement may be useful when quality control is a priority, when comprehensive labeling of evaluation metrics is desired, etc. For example, a human may actively select which data/entities should be used for training the ML model(s) used by the threat detection platform.

Figure 1D:
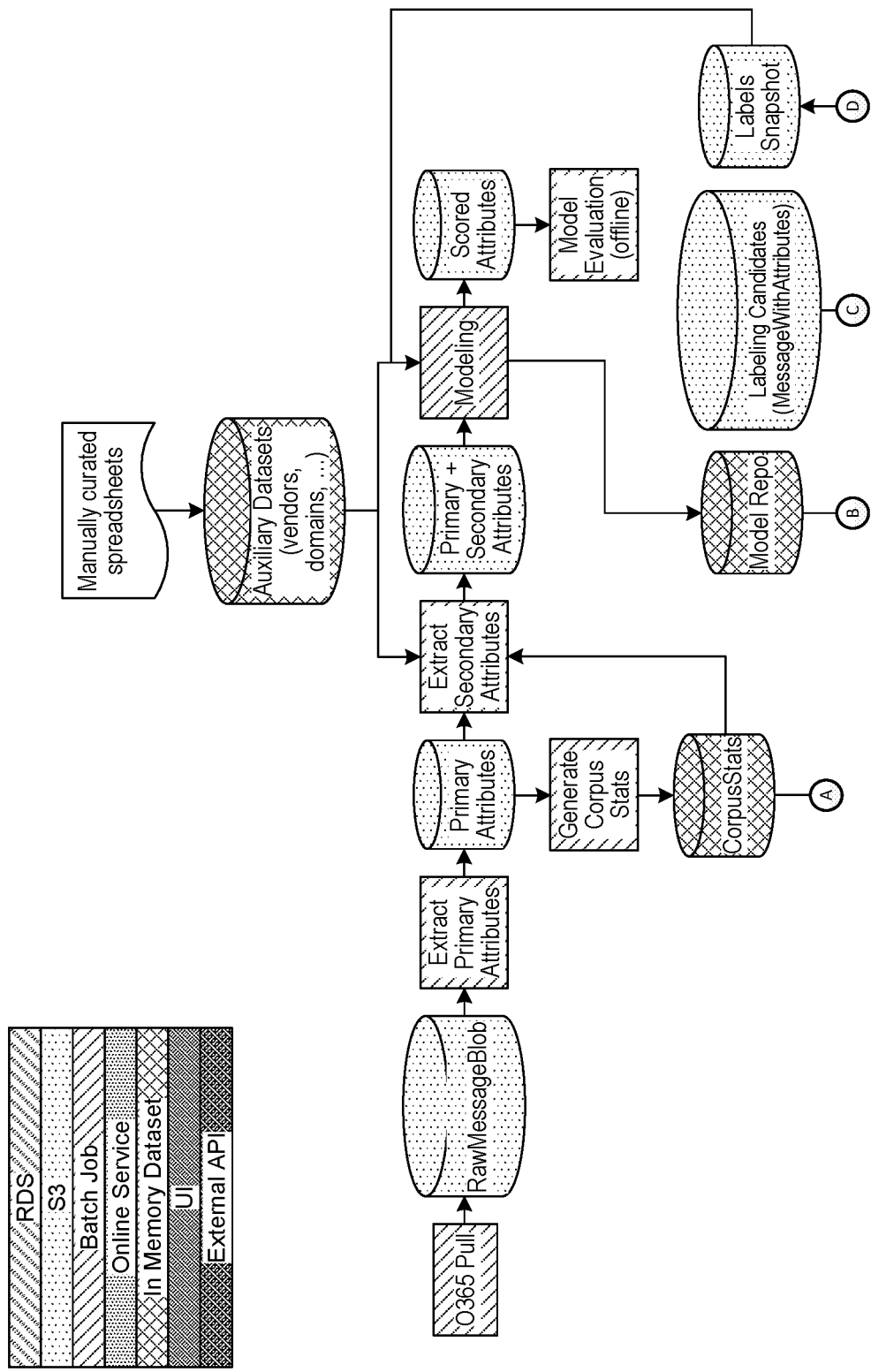
FIG. 1D depicts an example threat detection platform process.

FIG. 1D includes a more detailed example of a process by which a threat detection platform can process data related to past emails (here, acquired from Microsoft Office® 365), extract primary attributes from the past emails, generate corpus statistics based on the primary attributes, derive secondary attributes based on the primary attributes and the corpus statistics, train ML model(s) with the primary attributes and/or the secondary attributes, and then employ the ML model(s) to score incoming emails based on the risk posed to an enterprise.

III. Techniques for Deriving Topics for Messages

Threat detection platform 100 can characterize digital communications along several dimensions. These dimensions are also referred to herein as "facets." Facets are useful in several respects. As a first example, the facets can be used by an individual to resolve the types of attacks employed against an enterprise, as well as to create datasets that are useful for training, introspection, etc. The individual may be a member of the IT department of the enterprise, or the individual may be employed by a security service responsible for monitoring the security of the enterprise. As a second example, facets can be used as a way to divide data internally to allow teams to work on specific subsections of email attacks. These teams can then improve detection of the email attacks by training models on subset data and improve scoring module 108. As a third example, the facets can be provided as input to security operations center (SOC) tools that may be used to filter data, generate reports, etc. An incoming email may be associated with one or more of the following example facets:

Attack Type: This facet indicates whether the incoming email is indicative of business email compromise (BEC), phishing, spoofing, spam, etc. It is derived based on combinations of the following five facets.

Attack Strategy: This facet indicates whether the incoming email qualifies as name impersonation, internal account compromise, external account compromise, a spoofed message, a message originating from an unknown sender, etc.

Impersonated Party: This facet indicates who, if anyone, the incoming email intended to impersonate. Examples include very important persons (VIPs) such as c-suite executives, assistants, employees, contractors, partners, vendors, internal automated systems, external automated systems, or no one in particular.

Attacked Party: This facet indicates who was the target of the attack carried out by the incoming email. Examples include VIPs, assistants, employees, and external recipients such as vendors, contractors, and the like. In some embodiments, this facet may further identify the group or department under attack (e.g., the accounting department, human resources department, etc.).

Attack Goal: This facet indicates the goal of the attack carried out by the incoming email. Examples include invoice fraud, payment fraud, credential theft, ransom, malware, gift card fraud, and the like.

Attack Vector: This facet indicates how the attack is actually carried out, for example, by specifying whether the risk is posed by text, links, or attachments included in the incoming email.

These above example facets can be used as the "building blocks" for describing the nature of communication-based attacks, for example, to enterprises. Together, these facets can be used to characterize an attack along predetermined dimensions. For example, incoming emails can be characterized using one, some, or all of the above facets. A layer of configuration can be used over facets to define, establish, or otherwise determine the nature of an attack. For example, if threat detection platform 100 determines that, for an incoming email, (i) the attack goal is invoice fraud and (ii) the impersonated party is a known partner, then the threat detection platform can define the incoming email as an instance of "external invoice fraud." Consequently, these facets can flow into other functionality provided by threat detection platform 100 such as: (i) internal metrics indicating how the threat detection platform is managing different attack types, (ii) reporting to enterprises, and (iii) filtering for different attack types.

The above facets can be augmented to more completely/accurately represent the nature of a malicious communication. In particular, information regarding the topics mentioned in such communications can be used. Assume, for example, that several incoming emails related to different merger and acquisition scenarios are determined to be representative of phishing attacks. While each of the incoming emails have the same attack goal—that is, scamming the recipients—each incoming email is rather specific in its content. In such a situation, it would be useful to provide information about the actual content of the incoming emails to those individuals responsible for managing the threat posed by those incoming emails. Furthermore, some scenarios call for a more fluid approach to characterizing threats that allows threat detection platform 100 to more quickly surface new attack types. Historically, it has been difficult to measure, characterize, and report new attack types until sufficient training data regarding those new attack types has been provided to the appropriate models. Note that characterizing threats along a greater number of dimensions also lessens the likelihood of different communications being characterized as similar or identical. As an example, an email inquiring about invoices and an email requesting a quote may both be classified as instances of payment fraud if those emails are characterized along a limited number of dimensions. While those emails may have the same attack goal, the content of those messages is different (and that may be useful information in determining how to discover or remediate future instances of similar emails). An example of two messages sharing the same topic but two different attack goals is a shared topic of "invoice," with the first message having an attack goal of credential phishing ("click here to sign into your account and make a payment or update your payment information") and the second message having an attack goal of payment fraud ("your account is overdue, please send a check to pay your outstanding balance"). An example of two messages sharing the same attack goal but two different topics is a shared attack goal of "credential phishing," with the first message having a topic of "debit account detail updates" ("set up your new direct debit by clicking here") and the second message having a topic of "COVID-19" ("due to COVID-19 we have a new policy, click here to access our client portal and find out more").

Described herein are techniques for characterizing digital communications along a type of dimension referred to as "topics." Upon receiving a digital communication, threat detection platform 100 can apply one or more models in order to establish one or more topics of the digital communication. The term "topic" refers to a subject that is mentioned (either directly or indirectly) in content of the digital communication. As with the facets mentioned above, a given digital communication can be associated with multiple topics. Various combinations of topics, if present in a given message, can also be assigned/associated with more human meaningful descriptions (e.g., that can then be used to describe the message content instead of/in addition to each of the individual topics).

Topics can be derived by threat detection platform 100 regardless of whether the digital communication is deemed to be representative of an attack or not. In the event that the threat detection platform determines a digital communication is representative of an attack, the threat detection platform can generate and then surface a report that specifies an attack goal and topic(s) of the digital communication. Together, these pieces of information allow greater insight to be gained by the individual responsible for reviewing the report into the actual threat posed by the digital communication.

Figure 2A:
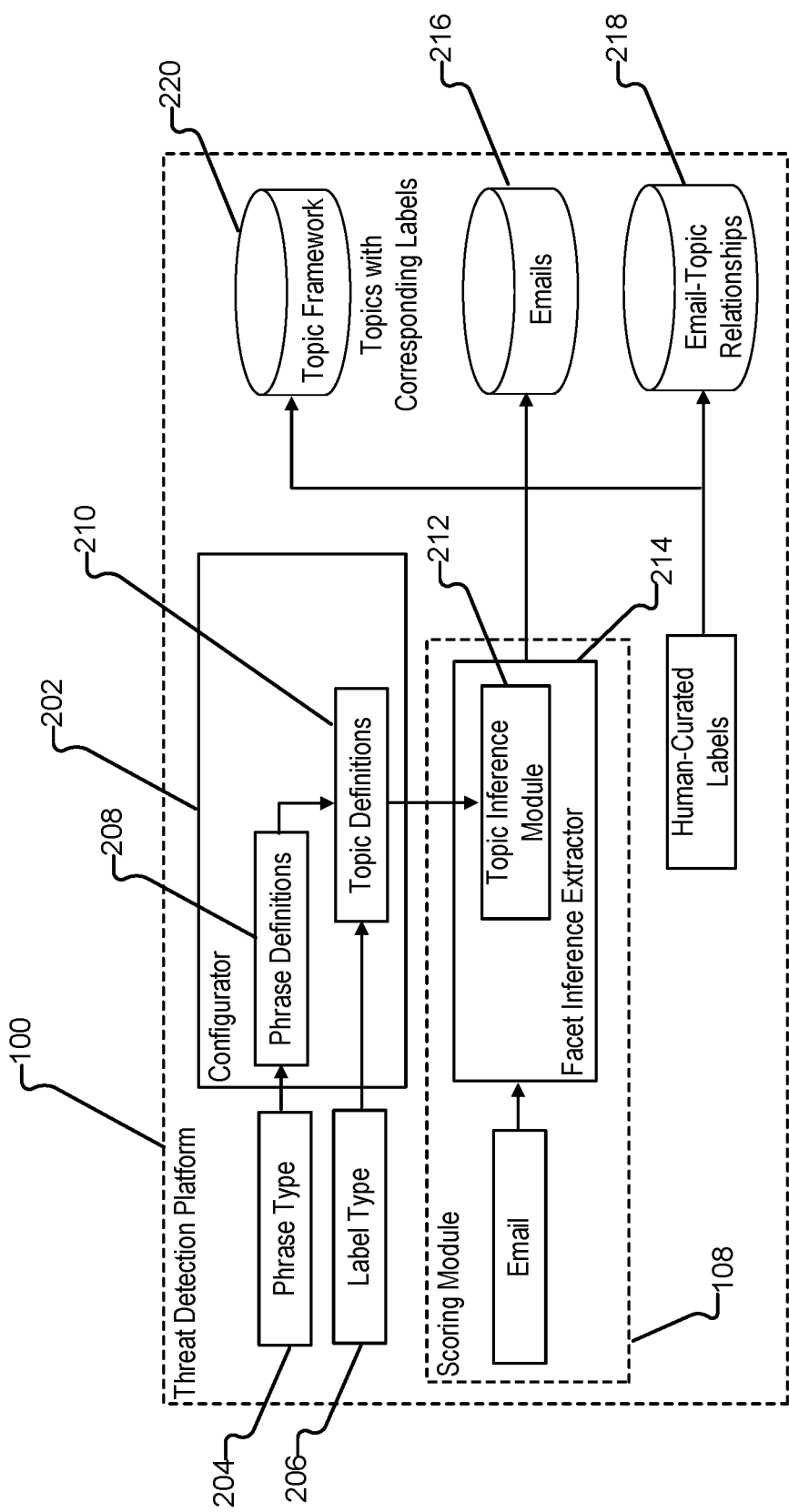
FIG. 2A illustrates an example of how topics of a digital communication can be discovered.

FIG. 2A illustrates an example of how topics of a digital communication can be discovered. Topics are designed to be fluid, and thus can be as expansive or specific as desired. Some enterprises may wish for more detailed information regarding the subjects discussed in malicious emails (e.g., "mergers and acquisitions" vs. "IPOs" vs. "bankruptcy"), in which case more topics may be available for classifying emails. Other enterprises may wish for less detailed information regarding the subjects discussed in malicious emails (e.g., "financial"), in which case fewer topics may be available for classifying emails. Further, enterprises can customize topics of particular relevance/importance to them (e.g., an engineering firm defining a set of topics around research and development vs. a shipping company defining a set of topics around transit, supply chains, etc.), instead of/in addition to topics of broad applicability (e.g., invoices). As applicable, enterprises can provide examples of labeled messages to threat detection platform 100 so that custom models/rules for identifying topics in accordance with those labels can be built/deployed. If needed, a larger data set can be constructed, e.g., using techniques such as nearest neighbor, text augmentation, etc. In various embodiments, topics are hierarchical/multi-class, e.g., with several different sub-topics/related topics grouped together (e.g., using multinomial prediction).

In an example implementation, a topic is: (i) a potential subject of text included in an email, (ii) inferable by a human and machine, and (iii) independent of malicious intent. Accordingly, topics can be defined for all emails examined by the threat detection platform, irrespective of whether those emails are representative of attacks. Note that, in some embodiments, topics are defined with sufficient granularity that a given email is labeled as pertaining to multiple topics. This can be done to increase the likelihood that different emails with similar attack goals, such as those mentioned above, are distinguishable from one another.

To create a new topic, the topic is added to configurator 202 by an administrator (e.g., of threat detection platform 100). As shown in FIG. 2A, phrase types (204) and label types (206) may initially be provided to configurator 202 as input. The phrase types can be used by configurator 202 to generate phrase definitions (208), and the label types and phrase definitions can be used by configurator 202 to generate topic definitions (210), mapping topics to different phrase definitions and locations. Topics defined within configurator 202 can then be persisted through to other components and/or layers of threat detection platform 100. As an example, topic definitions 210 can be provided to a topic inference module 212 of a facet inference extractor 214. As shown in FIG. 2A, in some embodiments, facet inference extractor 214 is executed by a real-time scoring module (e.g., an embodiment of scoring module 108) that is configured to quantify the risk posed by incoming emails as discussed above. Topic inference module 212 is configured to infer, based on outputs produced by scoring module 108, one or more appropriate topics for the email. In some embodiments, a given email will have two sets of topics associated with it by threat detection platform 100. The first set of topics corresponds to topics inferred by threat detection platform 100. The second set of topics corresponds to topics explicitly defined or curated by a user of the threat detection platform (e.g., an analyst or administrator of threat detection platform 100, or a representative of an enterprise).

Applicable topics are associated with a given email, e.g., in an appropriate storage location. For example, topic inference module 212 can append labels that are representative of the topics to the email itself, e.g., by using an API provided by an email provider to edit the message (e.g., stored within email store 216) to include the topics (e.g., as one or more X-headers or other metadata). As another example, topic inference module 212 can populate a data structure with information regarding the labels. This data structure can be stored in a database in which email-topic relationships are formalized (e.g., database 218).

In an example of how threat detection platform 100 can be used, suppose a particular type of attack makes use of a malicious email that discusses a merger and acquisition scenario. Configurator 202 can be used to create an appropriate topic so that similar emails can be identified in the future. In particular, configurator 202 creates an appropriate label (e.g., "merger&acquisition" or "M&A") for the topic and then associates with that label, a set of phrases (e.g., "merger and acquisition," "merger/acquisition," "tender offer," "purchase of assets," etc.) that can be used (e.g., as filters) to identify messages to be associated with the label. The topic definition (comprising a label and corresponding phrases) can then be provided to other portions of threat detection platform 100, such as a data object usable by topic inference module 212 (and, e.g., stored in topic framework database 220).

New topics can be automatically learned by/added to threat detection platform 100 based on an analysis of incoming emails and/or outgoing emails. Additionally or alternatively, individuals (e.g., an administrator of threat detection platform 100) can be permitted to manually create topics (e.g., by accessing an administrative console provided by threat detection platform 100). Any human-labeled topics can be altered or deleted by threat detection platform 100 as applicable, based on, for example, whether the manually added topics are actually present in emails (i.e., do any messages match the topic), whether those manually added topics align or overlap with existing topics, etc.

The attack goal facet attempts to characterize an end goal of a given email. As such, the attack goal facet has malicious intent associated with it. Conversely, the topic facet refers to the subjects that are raised in, or related to, the content of an email or other communication (without regard to maliciousness). Table I includes examples of emails with corresponding topics and attack goals.

TABLE I

Examples of emails and corresponding topics and attack goals.

| Email Description | Possible Topic | Possible Attack Goal |
|---|---|---|
| Credential theft message in the context of file sharing a link to an invoice | File Sharing, Invoice | Credential Theft |
| Fraud message in the context of external invoice | Bank Account Information, Call to Action/Engagement, Invoice Payment | Invoice Fraud |
| Merger and Acquisition Scam | Mergers and Acquisition | Scam |
| Cryptocurrency Engage Message | Call to Action/Engagement, Cryptocurrency | Engage |
| Reconnaissance Message | None | Spam |
| Payment Fraud Message that uses COVID-19 as Pretense | COVID-19, Request for Quote (RFQ) | Payment Fraud |

As can be seen in Table I, it is possible for topics and attack goals to overlap in some instances. For each email, threat detection platform 100 may introduce a many-to-many relationship between the email and the topic labels in which a topic can be associated with more than one email and an email can be associated with more than one topic. Such an approach allows the threat detection platform to support several possible queries, including:

The ability to filter emails by topic or combination of topics;

The ability to count the number of emails associated with a given topic; and

The ability to modify the topics associated with an email, as well as create labels for those topics.

Tables II-IV illustrate various examples of schemas that can be used by embodiments of threat detection platform 100 to associate emails with topics (e.g., in database 218).

TABLE II

Example schema for topics.

| Column Name | Data Type | Column Metadata |
|---|---|---|
| Topic_ID | Integer | Primary Key |
| Topic_Name | str/varchar(255) | Indexed, unique, fixed |
| Date_Created | Date, Time | |
| Topic_Display_Name | str/varchar(255) | How topic is shown to user |

TABLE III

Example schema for storing human-confirmed topics.

| Column Name | Data Type | Column Metadata |
|---|---|---|
| Topic_ID | Integer | Primary Key |
| Message_ID | Integer | Foreign Key |
| Human_Labeled | Boolean | |
| Date_Created | Date, Time | |

TABLE IV

Example schema for storing inferences for measurement.

| Column Name | Data Type | Column Metadata |
|---|---|---|
| Topic_ID | Integer | Primary Key |
| Message_ID | Integer | Foreign Key |
| Date_Created | Date, Time | |

In some embodiments, threat detection platform 100 uses a domain specific language (DSL) to match against messages and their attributes. The DSL allows for the dynamic addition of different rules to assign messages topics, based on static features of the message (e.g., does it contain particular pre-defined phrases) or more dynamic features (e.g., using one or more models to score a message and derive topic information from the score(s)). One benefit of the lightweight nature of topic specification is that time-sensitive topics can be readily added to threat detection platform 100. As an example, attackers often make use of current/world events to lend legitimacy to their attacks (e.g., an attacker referencing a recent fire or other natural disaster as a reason that an email recipient should take an action, such as logging into a payment system). Such topics can efficiently be added to threat detection platform 100 to help identify attacks.

Below are examples of topics and corresponding DSL to identify when a given message matches a topic:

Example Topic: Cryptocurrency

```
"topic_cryptocurrency": [{
"sec:HAS_BITCOIN_ADDRESS": true
},
    {"sec:HAS_BTC_RANSOMWARE_LINGO":true},
    {"feat_attr:CRYPTO_TOPIC_MODEL/gt":0.7}
]
```

The above DSL states that a message can be classified as having a "cryptocurrency" topic if any of the following is true: (1) it includes a bitcoin address, (2) it uses commonly found bitcoin ransomware expressions, or (3) a trained cryptocurrency topic model scores the content higher than 0.7.

Example Topic: Document Sharing

```
"topic_document_sharing": [
  {
    "sec:SUBJECT_HAS_DOCUMENT_SHARING_VOCAB":
    true,
    "feat_attr:DOCUMENT_SHARE_TOPIC_MODEL/gt":0.9
  },
  {
    "sec:BODY_HAS_DOCUMENT_SHARING_VOCAB": true,
    "feat_attr:DOCUMENT_SHARE_MODEL/gt":0.8
  }
]
```

The above DSL states that a message can be classified as having a "document sharing" topic if either of the following is true: (1) it has document sharing vocabulary in its subject line and the topic model gives it a score of higher than 0.9, or (2) it has a document sharing vocabulary in its body and the topic model gives it a score of higher than 0.8.

Figure 2B:
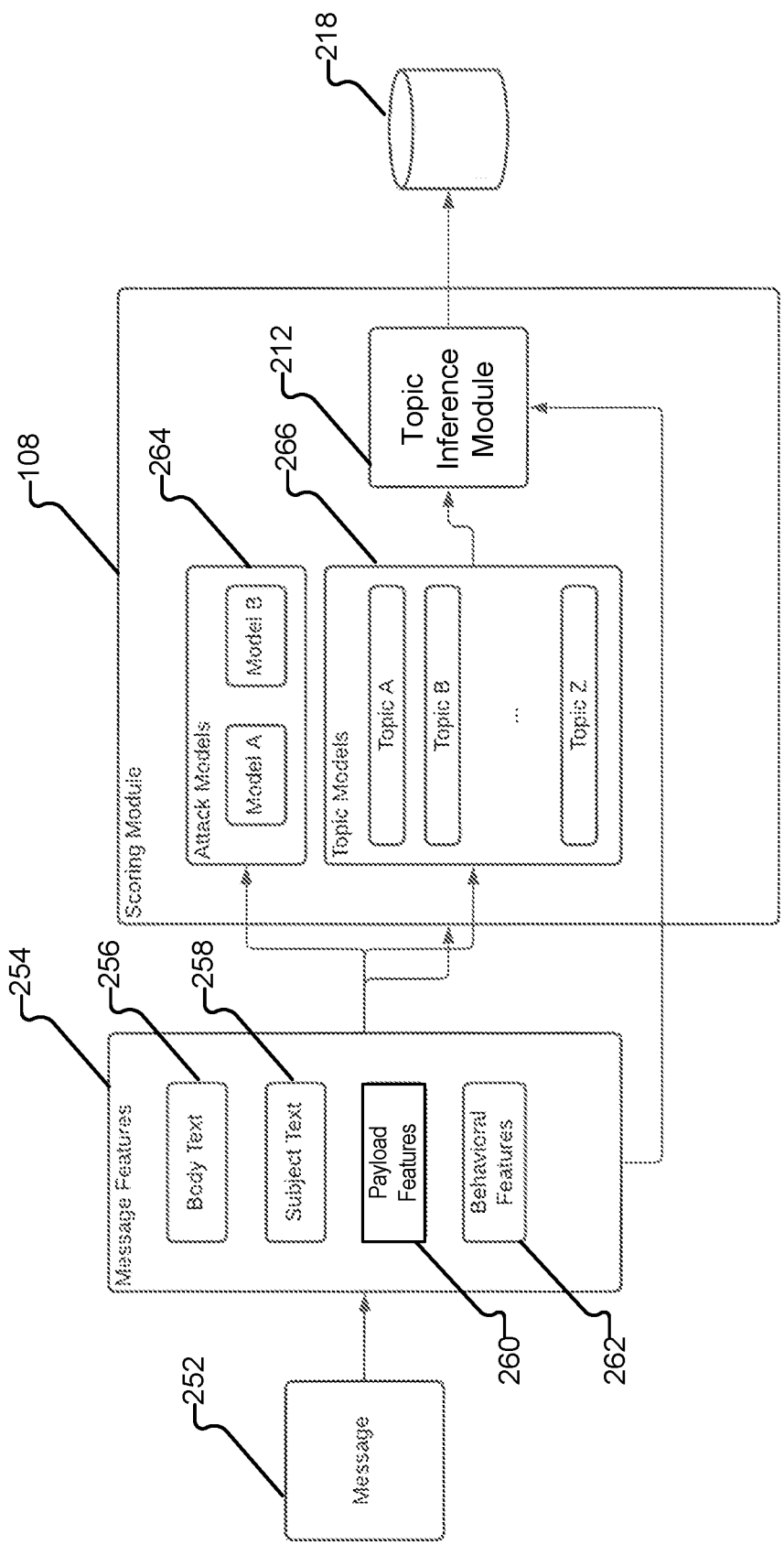
FIG. 2B illustrates an example of a message being processed by a scoring module.

FIG. 2B illustrates an example of a message being processed by a scoring module. As shown, message 252 (e.g., an email message retrieved by threat detection platform 100 from an email provider) has various features 254 (e.g., a body text 256, a subject text 258, payload features 260, and behavioral features 262) that are extracted by threat detection platform 100 and provided to scoring module 108.

Scoring module 108 includes a variety of attack models 264 (e.g., assessing whether a particular message is likely to be a phishing attack or a payment fraud attack), and topic models 266 (e.g., assessing whether a particular message discusses a corresponding topic). The extracted features are consumed by both the attack models and the topic models. In various embodiments, scoring module 108 (and subcomponents thereof) is implemented using a set of python scripts. As previously discussed, topic inference module 212 infers one or more topics to associate with message 252 and stores the message/topic(s) mapping in database 218. As applicable, if the topics assigned by topic inference module 212 are determined to be incorrect (e.g., as reported by an end user/message recipient), they can be changed (e.g., by an analyst) and any such mislabeled messages can be used to retrain topic models 266. In various embodiments, attack models 264 include one or more models related to payloads. A first example of such a model is an attachment text model which can be used to determine whether text included in a payload is potentially harmful (e.g., an attachment includes language referencing a ransomware attack). A second example of such a model is a web page model which can be used to determine whether a link included in a message is directly (or indirectly) potentially harmful. A third example of such a model is an attachment model which can be used to determine whether the attachment includes a malicious mechanism (e.g., an Excel document with problematic macros as contrasted with a plain text document or simple Microsoft Word document that does not contain any links).

IV. Approaches to Rapidly Retraining Models

As discussed above, threat detection platform 100 can apply one or more models to incoming emails addressed to employees to establish the risk posed to the security of an enterprise in near real time. These models can examine the context and content of the incoming emails to determine whether any of those emails are malicious. In order to protect against novel threats, threat detection platform 100 can consistently train the models using up-to-date information. For example, threat detection platform 100 can train the models on a periodic (e.g., daily or weekly) basis, or the threat detection platform may train the models whenever a sufficient amount of new information is available for training purposes.

The information used for training—also referred to as "training data"—may include insights gained by the threat detection platform and/or insights provided by individuals. Examples of such individuals include observations/predictions by researchers, SOC analysts, IT professionals (e.g., of novel/emerging threats), and/or reports of malicious messages that threat detection platform 100 failed to identify as malicious (e.g., false negatives reported by end users to IT professionals or to threat detection platform 100 as applicable). Regardless of its source, the training data can be consumed by a pipeline used by the threat detection platform for rapid retraining of its models.

As an example, suppose that the following malicious message was sent to an end user of threat detection platform 100, Alice, and that threat detection platform 100 did not detect the message as malicious:

===

Subject: Account Payment Overdue

We haven't received the invoice payment for invoice #12335. We've been trying to contact your accounting department for a month and if we don't hear back your service will be terminated immediately.

Regards,

Oleg

===

There are a variety of reasons why threat detection platform 100 might not have deemed the incoming email to be malicious. As one example, threat detection platform 100 may not have, as a defined attack strategy, a suggestion that a service will be terminated if an action is not taken. This attack strategy has become increasingly common. To avoid harm from similar attacks, it would be beneficial to immediately retrain a text model to learn that this pattern in an incoming email message poses a risk. A variety of challenges exist in developing a retrainable platform that is able to detect email-based attacks:

- For new attacks, a very limited set of examples tends to be available. These examples are easily ignored throughout model training at least in part because the number of samples is limited.
- It is difficult to maintain model precision because in a large volume of non-malicious emails there are often many "edge cases" that appear to be similar to malicious emails.
- A robust pipeline must be implemented to ensure that the latest data is available for training. Because of the rate at which attackers alter strategies, there is little benefit in using "stale" data for training.
- It is difficult to find a model architecture that is quick to retrain, robust to convergence, and expressive enough to learn nuances.

There will always be new types of email-based attacks that a threat detection platform will (at least initially) fail to catch. This is true regardless of how often retraining occurs. A threat detection platform will tend to miss these new types of email-based attacks because the expressions included in the body are rarely, if at all, observed in the data that was used to train its production models.

Because of the complexity in detecting email-based attacks, it can take a long time for a threat detection platform to learn to catch new types of email-based attacks in an organic (generalized) way. For example, threat detection platform 100 may not learn how to detect a new type of email-based attack until multiple instances of that attack are discovered over the course of several days, weeks, or months. One goal of the techniques described herein is to allow retraining to occur rapidly so as to limit the harm from these new types of email-based attacks. The techniques described herein not only allow a threat detection platform to be rapidly trained to detect attacks that involve new phrases, but also permit human input that can serve as a "patch." For example, an individual can use an interface provided by threat detection platform 100 to "tune" rules learned by the threat detection platform in order to specify when the use of a given phrase is legitimate and when the use of the given phrase is illegitimate.

Figure 3A:
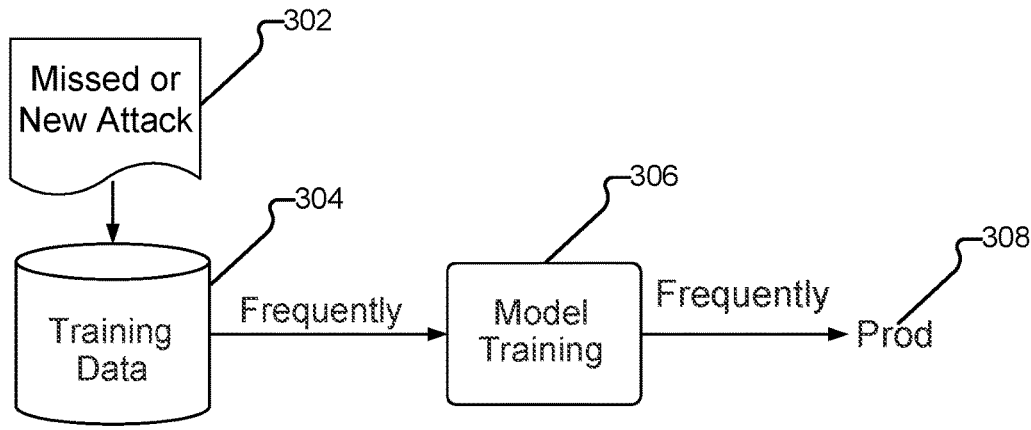
FIG. 3A illustrates a process for quickly retraining a model.

FIG. 3A illustrates a process for quickly retraining models in accordance with embodiments of techniques described herein. When a missed attack is identified (e.g., a false negative is reported) or when a new attack is anticipated (e.g., through research or analysis of reported emails), these missed and/or new attacks (generally referred to herein interchangeably as a "missed attack" (302)) can be added to a training set 304 for training model(s) employed by threat detection platform 100 and used to retrain the model(s). For example, the model(s) can be retrained (306) whenever new training data is available (or whenever a threshold amount of new training data is available), and/or the model(s) can be retrained on a scheduled (e.g., daily, weekly, or monthly) basis. Those model(s) can then be validated and pushed to production (308) at a similarly quick cadence.

This retraining approach can be used both in the context of a single model, and can also be used by threat detection platform 100 to rapidly retrain dozens or hundreds of models, and those models can be applied individually or collectively (e.g., as "sets" of multiple models) to incoming emails.

Figure 3B:
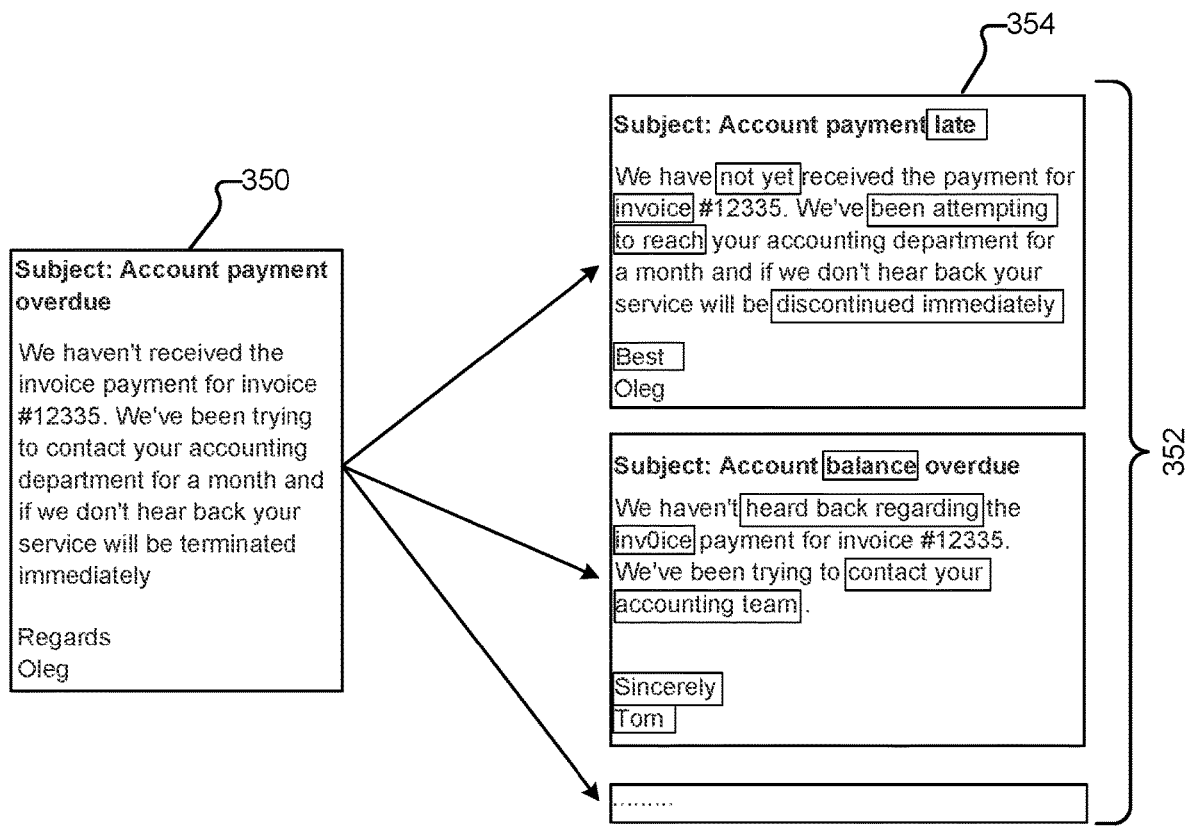
FIG. 3B illustrates how multiple examples of a new attack can be created from a single example of the new attack through text augmentation.

Adding a single sample (e.g., sample 350) as additional data for (re-)training is unlikely to result in notable improvements to a given model. At best, such a resulting model will be unlikely to be able to identify any new attacks beyond ones carried out using identical content, even if a weighting scheme is employed. It would be desirable for the model to learn to detect similar, but not identical, attacks since attackers are unlikely to use the exact text template in future attacks. In various embodiments, text augmentation is used by threat detection platform 100 to address this and other issues: for each missed (or new) attack, threat detection platform 100 can generate a series of synthetic training samples using text augmentation. To perform text augmentation, threat detection platform can use open source libraries, proprietary libraries, and/or open source libraries that have been modified in some manner (also referred to as "hybrid libraries"). Example results of text augmentation are shown in FIG. 3B. In FIG. 3B, the above-mentioned malicious email (350) has been used to create a set of additional (synthetic) samples (352) through text augmentation. In particular, the content of malicious email 350 has been programmatically modified to create additional emails that are semantically similar to malicious email 350 (without threat detection platform 100 needing to have received actual reports of actual additional similar malicious emails). Together, malicious email 350 and additional emails 352 are representative of an augmented collection of examples of an attack. This augmented collection covers many possible attacks that use similar natural language and can be used to help model(s) learn to generalize threats beyond the specifics of a single sample attack, and thus better anticipate future attacks of a similar nature but with different content.

In some situations, a single additional sample may be sufficient for training (i.e., text augmentation is used on malicious message 350 to generate a single synthetic message such as message 354, and both messages are used to retrain a model). In other situations, additional samples may be needed for training. The number of additional samples that are created by threat detection platform 100 can be configured to vary based on factors such as how many authentic samples (e.g., sample 350) are available, how significant a risk is posed by the malicious email, and how many libraries are accessible. In some embodiments, the number of additional samples is predetermined (e.g., programmed into threat detection platform 100 or specified through an interface generated by the threat detection platform as applicable).

After threat detection platform 100 generates the set of synthetic training samples, those training samples can be used to train one or more models that are applied by threat detection platform 100 to incoming emails. As an example, a combination of word- and character-level convolutional neural networks (CNNs) is used to learn to predict various attack labels based on the content of incoming emails. The attack labels specify whether an incoming email is malicious, spam, graymail, etc. (and/or can also specify particular types of attacks, e.g., phishing, cryptocurrency, etc.). These newly trained model(s) can then be used as an indicator of risk or as an input into a scoring module (e.g., scoring module 108 of FIG. 1A).

Figure 4:
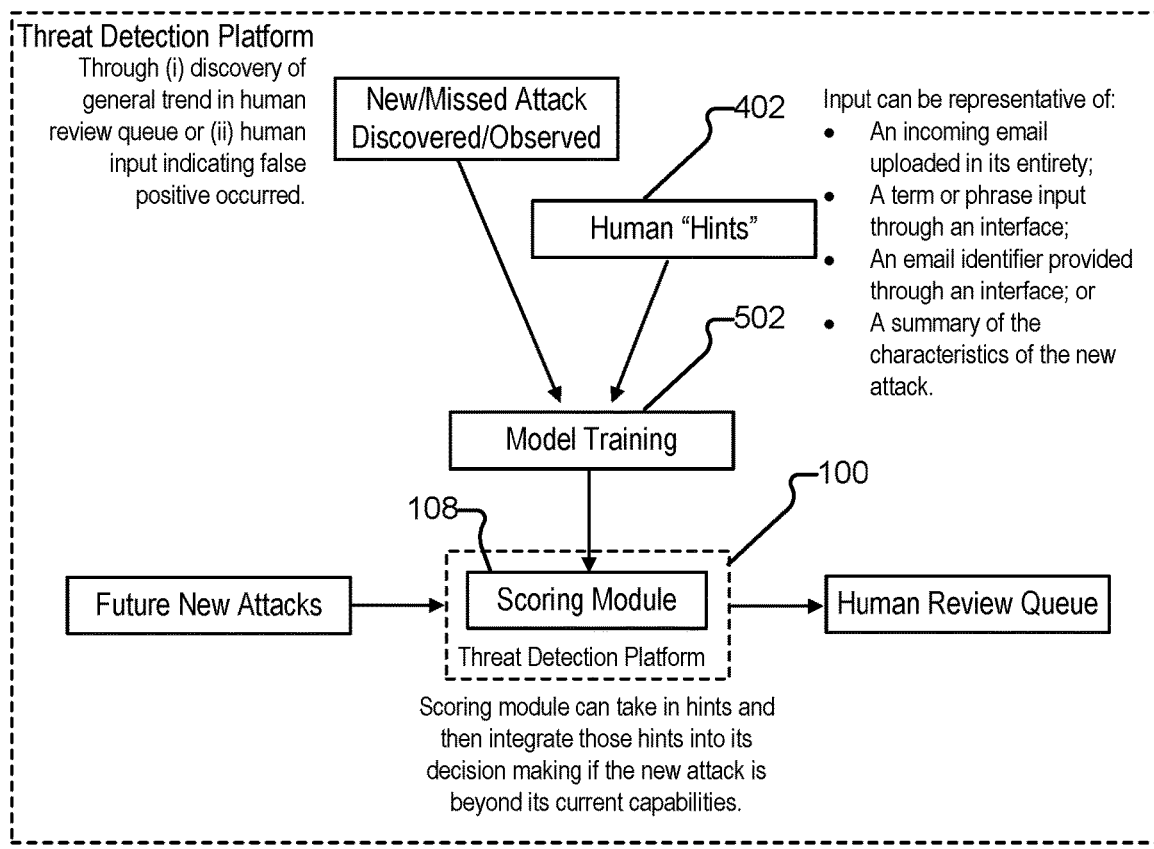
FIG. 4 illustrates an example of how a threat detection platform can initiate retraining in response to observing a new type of attack.

FIG. 4 illustrates an example of how threat detection platform 100 can initiate retraining in response to observing a new type of attack (e.g., one for which the platform's existing models will not identify an associated malicious message). As shown in FIG. 4, threat detection platform 100 may initially observe a new attack. In some scenarios, threat detection platform 100 receives an input indicative of a notification that the new attack was observed. For example, an individual (such as an administrator or an end user) may indicate through an interface provided by the threat detection platform that the new attack was observed. In other scenarios, threat detection platform 100 infers that a new attack was observed based on a general trend in a human review queue (used, e.g., by human analysts to provide quality assurance to machine generated labels, confirm reported false negatives, etc.). For example, threat detection platform 100 can infer that a new attack was observed responsive to a determination that a certain number of similar or identical emails that were initially determined to be non-malicious (e.g., by deployed production models used by threat detection platform 100) have since been labelled (e.g., by a human reviewer) as malicious. These types of emails are referred to herein as examples of "false negatives" since threat detection platform 100 initially erroneously classified those emails as non-malicious.

In some embodiments, threat detection platform 100 allows "hints" to be provided (e.g., via an interface provided by threat detection platform 100) for retraining in an efficient manner. One example of a hint is an example of a threat message that is representative of a novel attack (e.g., an actual threat or one written by a security analyst to emulate a real threat). Other examples of hints include key terms and phrases related to a novel attack. Additionally or alternatively, an individual can input a summary of characteristics of a new attack. Using the hints, threat detection platform 100 (and, more specifically, training module 104) can train a model used by scoring module 108. This incorporation of the hints ensures that the model is able to detect future instances of the new attack.

Several different approaches to retraining the models can be used by the threat detection platform. In FIGS. 5-9, the term "FN" stands for a new attack that has one or more suspicious signals embodied in text. Examples of text-based signals that could prompt suspicion include "transfer funds," "wire immediately," and "late payment." By implementing approaches such as are described herein, a threat detection platform can accomplish various of the following:

Consistently and automatically retraining models to identify terms and phrases that are indicative of new types of attacks;

Providing an interface through which individuals can input terms and phrases that serve as "hints" for training models in an efficient manner;

Maintaining models that are able to consistently and accurately detect instances of BEC through analysis of the content (e.g., text) of incoming emails;

Using models to predict intent from the content (e.g., text) of incoming emails; and Identifying new types of attacks, collecting information related to those attacks, and then training targeted models to detect those attacks based on an analysis of the content (e.g., text) of incoming emails.

Figure 5:
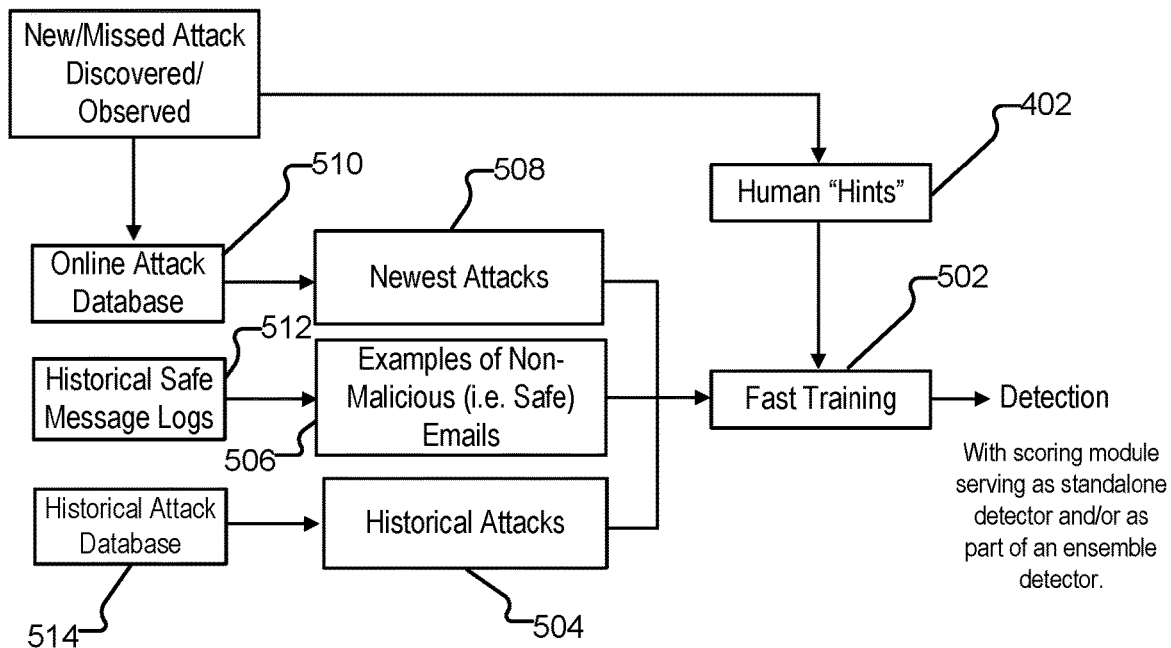
FIG. 5 illustrates an approach to retraining in which the entire system is retrained frequently by the threat detection platform but in batches.

FIG. 5 illustrates an approach by which a threat detection platform can autonomously (re-)train itself to discover new attacks. When threat detection platform 100 discovers a new attack—for example, through research or false negative discovery—threat detection platform 100 can then feed this new attack alongside historical databases of known attack messages and known "safe" messages into a fast retraining module. This can be done immediately (i.e., upon discovering the new attack) or periodically (e.g., every day, week, or month, or upon determining that a predetermined number of new attacks has been discovered). Human-defined hints can also be defined/provided as input to fast retraining module 502 to ease the job that fast retraining module 502 has in identifying these attacks. Such hints can be in the form of suggested phrases, rules, features, combinations thereof, etc.

FIG. 5 illustrates one approach in which an entire system is retrained frequently but in batches. On a periodic (e.g., daily, weekly, or monthly) basis, threat detection platform 100 defines a "job" that involves the construction of a dataset containing (i) all historical attacks with text, (ii) a representative sample of non-malicious emails with text, and (iii) newest attacks with text. As mentioned above, threat detection platform 100 can also permit human hints to be provided as input for retraining a simple model, which in the end may be used by the threat detection platform as a standalone model, in a rule, or in an ensemble.

Assume that the threat detection platform is programmed to retrain a given model on a daily basis. In such a scenario, threat detection platform 100 will obtain the latest "golden label" dataset that includes information on all historical attacks (504), a list of non-malicious emails received over a first period of time (506), and a list of all new attacks occurring over a second period of time (508). Data 504, 506, and 508, as well as any hints 402 are collectively used as training data by fast training module 502. While the first and second periods of time will normally be the same length (e.g., one, two, or three days), that need not necessarily be the case. The golden label dataset can variously include information on all historical attacks against a given account or a given enterprise/industry/etc., or all historical attacks observed by threat detection platform 100. Generally, these three datasets will be acquired, received, or otherwise obtained from multiple sources. Threat detection platform can perform data extraction to identify the malicious emails of interest to be used for retraining. A benefit of this approach is that it permits various combinations of models and ways to implement human hints.

FIGS. 6-9 illustrate alternative approaches to retraining.

Figure 6:
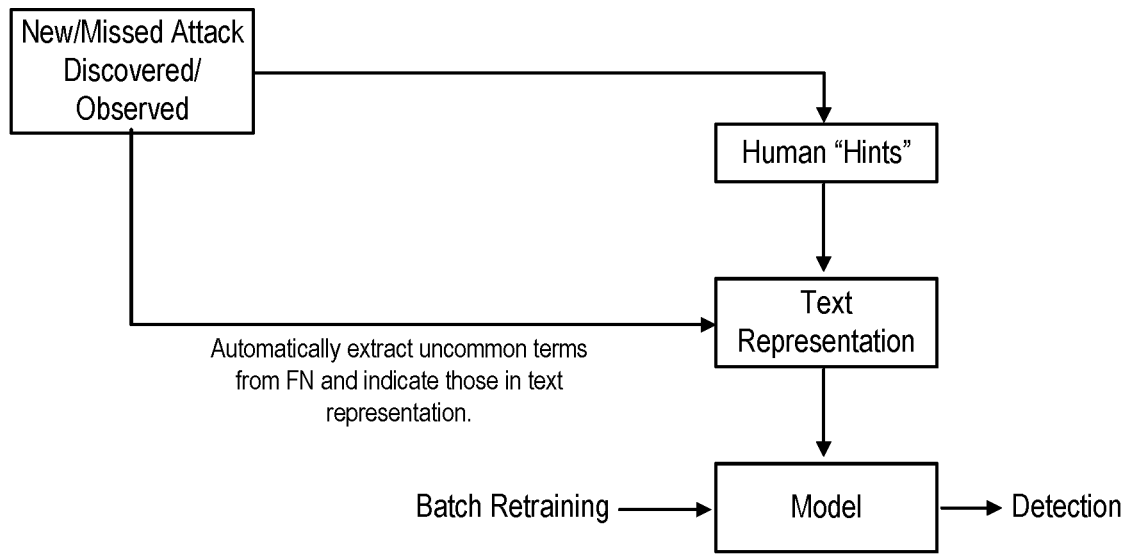
FIGS. 6-9 illustrate alternative approaches to retraining.

The approach shown in FIG. 6 retrains in near real time by implementing a text representation of a new attack as a static model. When a new/missed attack is discovered/observed, an individual can input a hint (e.g., a sample message or phrase) and then the threat detection platform can extract unusual or uncommon terms from the hint. By distributing these extracted terms, the threat detection platform can immediately adjust the text representation without changing the model itself until retraining is performed. Retraining can be performed in a similar manner as shown in FIG. 5. A benefit of this approach is that it allows for nearly instantaneous conversion of new attacks into detectable features (e.g., phrases).

Figure 7:
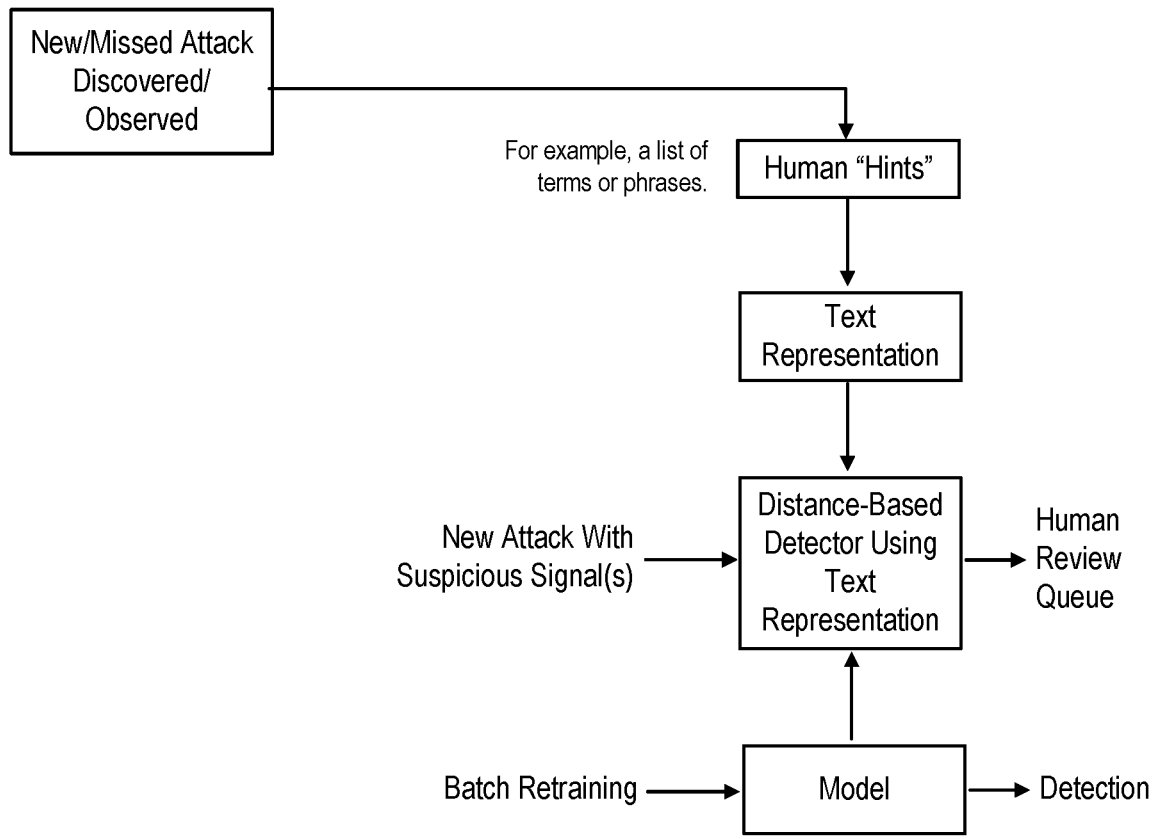

The approach shown in FIG. 7 discovers comparable attacks based on similarity metrics (also referred to herein as "distance metrics"). When a new/missed attack is discovered/observed, an individual can input a list of phrases as a "hint." Those phrases can then be turned into corresponding text representations, for example, using embedding and k-hot representation. The threat detection platform can employ a distance-based detector to which text can be provided as input. If the content of an incoming email is within a certain distance threshold of those human-defined hints, then the incoming email can be placed by the threat detection platform into a human review queue. When the model is retrained and a confirmation in made that the new attack can be caught, then those hints can be removed. This approach represents a good way to find new types of attacks as key phrases can be quickly identified.

Figure 8:
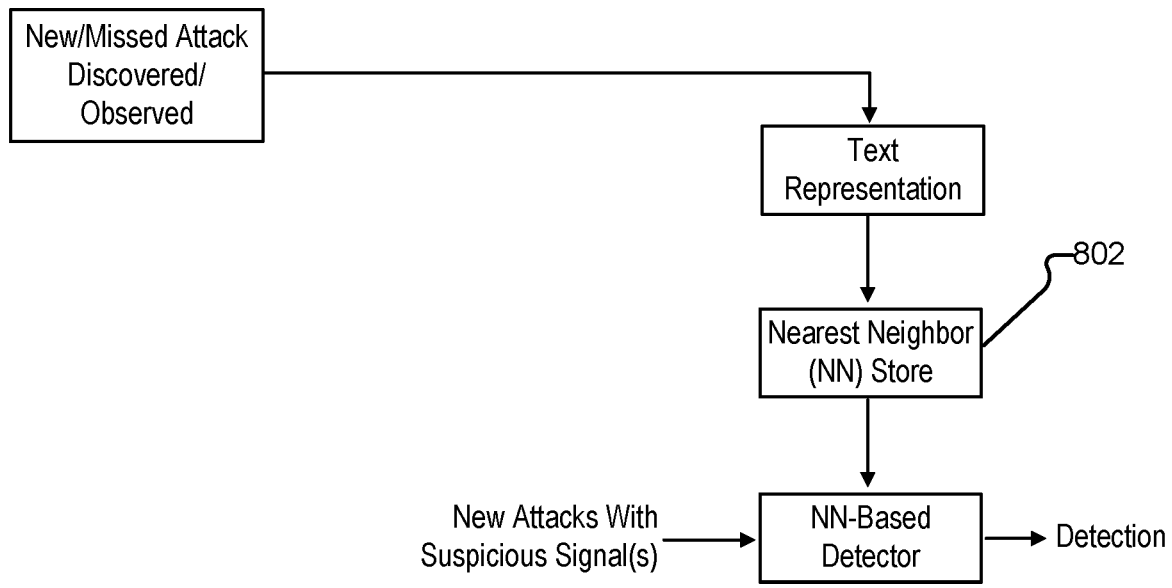

The approach shown in FIG. 8 discovers comparable attacks based on nearest neighbor determination. For each new/missed attack, threat detection platform 100 can automatically convert the corresponding email into a text representation and then store the text representation in a data-store (802). Using a nearest neighbor approach, threat detection platform 100 can determine whether incoming emails are malicious (irrespective of whether or not retraining in accordance with embodiments described herein has been performed) based on a comparison against a nearest neighbor model. An example way of implementing the processing shown in FIG. 8 is using the annoy nearest neighbor python library (https://github.com/spotify/annoy). The approach is largely similar to a text-based signature approach. Malicious emails can be placed in a queue for human review. Benefits of this approach include that it is efficient for the threat detection platform to quickly identify similar emails based on a textual comparison, and no human input is required.

Figure 9:
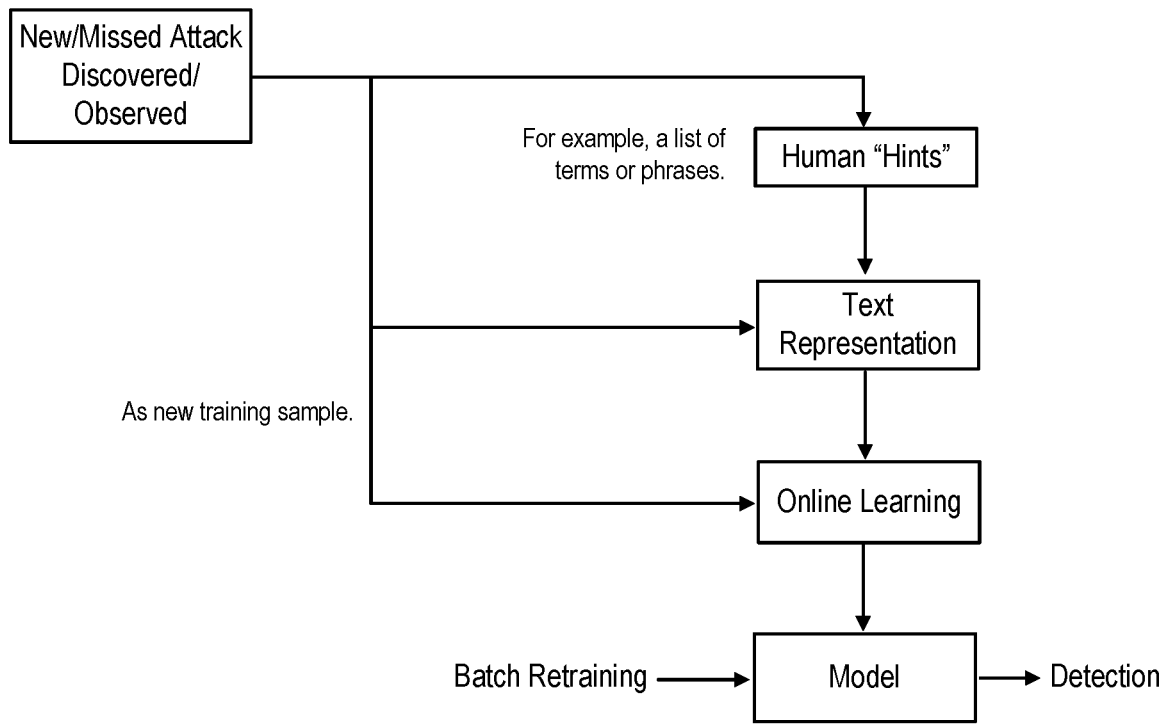

The approach shown in FIG. 9 relies on an online system that updates itself when a new training sample arrives without requiring any human input. The approach shown in FIG. 5 is similar to the approach shown in FIG. 9 in several respects. The approach shown in FIG. 5 can be sped up by incorporating aspects of the approach shown in FIG. 9, especially the online updating element. There are multiple benefits to the approach shown in FIG. 9. First, models can be quickly updated. Second, hints provided by individuals and information extracted by the threat detection platform can be readily consolidated without issue.

V. Example Process

Figure 10:
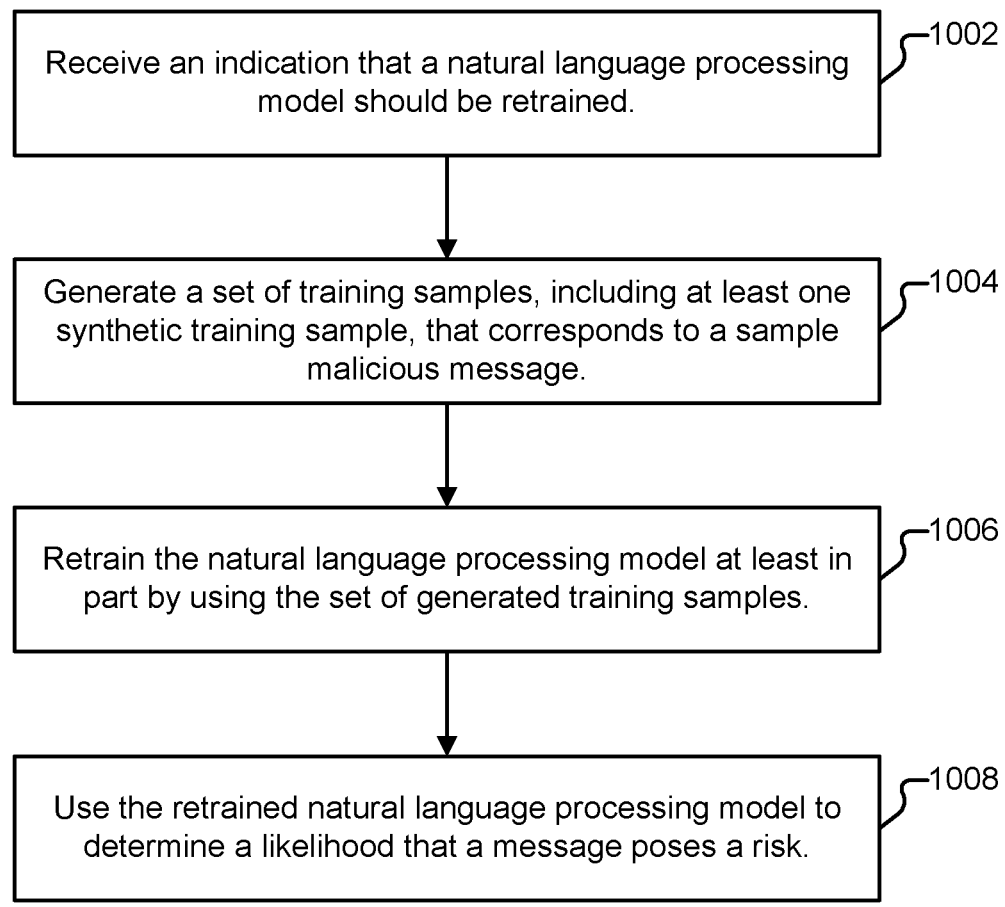
FIG. 10 illustrates an example of a process for retraining a model.

FIG. 10 illustrates an example of a process for retraining a model. In various embodiments, process 1000 is performed by a threat detection platform, such as threat detection platform 100. The process begins at 1002 when an indication that a natural language processing model should be retrained is received. The indication can be either manually triggered or automatically (e.g., as part of a daily batch process).

At the outset of the COVID-19 pandemic, attackers took advantage of workplace-related disruptions and commenced a previously-unseen type of attack (invoking COVID-19 in phishing and other scams). As such scams were novel, they were not initially caught by natural language processing models trained prior to the commencement of the pandemic. An example of such a scam is reproduced below:

===Exemplar Message===
Subject: Covid-19 important information
Body: We hope that you and your loved ones are taking all the necessary precautions to stay safe and well during this Coronavirus (COVID-19) outbreak. As you know, the Corona virus outbreak is having an ever-growing impact on every aspect of our society, and that includes the ability of businesses to keep their doors open, our primary focus is to support you through this difficult time. There is an important update for all users <Credit Card Name> user to prevent your account against fraud during the lock period, please kindly login to below link to update your account.
===

Initially (e.g., in March 2020), threat detection platforms such as threat detection platform 100 might have erroneously classified such a message as benign, as scams exploiting COVID-19 were novel. An end user (e.g., Alice) receiving such a message could then be compromised, e.g., by being tricked by the message to supply credentials to her banking information. Soon, however, it was noticed (e.g., by analysts, victims, etc.) that such messages posed a significant security risk.

Identifying COVID-19 as an element of a scam can be accomplished in a variety of ways. As one example, if an end user receives a message that they find suspicious, they can forward the message to an administrator and/or to a special account (e.g., abuse@abnormalsecurity.com) to request that the message be investigated. When threat detection platform 100 receives reports of false negatives (and/or receives a threshold number of reports of false positives), those reports (or, as applicable, in response to confirmation by an administrator of threat detection platform 100 that the reports are genuine/correct/of concern, etc.) are examples of receipt of an indication that retraining should occur (1002). Reported false negatives can be stored for later use by threat detection platform 100, such as in a false negative database (e.g., stored within online attack database 510). As another example, instead of waiting for false positives to be reported (e.g., by end users, administrators, etc.), an indication can also be received at 1002 when an administrator (or other appropriate user) interacts with an interface provided by threat detection platform 100 to provide "hints" (e.g., hints 402) about novel attacks. As an example, irrespective of whether an actual threat has been observed (and, for example, reported as a false negative by an end user), an administrator of threat detection platform 100 or other appropriate entity (e.g., a representative of a customer's IT department, etc.) can provide as a "hint" a sample attack message (and/or a list of key words/phrases that differentiate the novel attack from previous ones). In an example use case, suppose a government entity or other entity becomes aware of intelligence suggesting that a particular industry (e.g., dental practices, fast food franchises, accountants in the New York area, university finance departments, etc.) is/will soon be targeted by a particular novel attack. The providing of applicable hints 402 (e.g., a custom crafted "threat" email or key phrases) can be used to start process 1000.

At 1004, a set of training samples is generated. The number of training samples to be generated can be set to a fixed number (e.g., generate as many samples as are needed to achieve a training set that has at least 1,000 samples for a particular type of threat) or can vary, as applicable. The generated samples can be stored in any appropriate manner, e.g., in a PostgresQL database. An example way to generate a training set is by performing text augmentation on a false negative message (or on the resulting messages) to generate a set of synthetic samples. An example way that threat detection platform 100 can perform such text augmentation is by executing a set of one or more python scripts that make use of the nlpaug library for text augmentation (e.g., available at https://github.com/makcedward/nlpaug).

Three example types of text augmentation include character level augmentation, word level augmentation, and flow/sentence level augmentation. With character level augmentation, individual characters are added, removed, or replaced in the input text. With word level augmentation, words are added, removed, or replaced (e.g., with synonyms) in the input text. With flow/sentence level augmentation, clauses/sentences are added, removed, or modified/rearranged. A goal is for the resulting samples to appear semantically similar to the exemplar (such that a human viewing the entire set of messages would consider them to be conveying the same information). The type and/or amount of augmentation (e.g., as a percentage of the message, as a total number of modifications to make, etc.) to be performed can be benchmarked, and/or tuned to help achieve this goal. Further, a candidate set of false negative messages (or other types of messages for which augmentation is desired, in various embodiments) can be filtered/vetted to ensure that only appropriate messages have their volume amplified. Examples of such filters include requiring that a given message be a confirmed customer reported false negative (e.g., the message poses a clear, real threat to end users and is not currently caught by existing models), be payloadless (e.g., the threat posed is a social engineering attack, not malware), and have a clear meaning.

Four examples of synthetic training samples that can be created from the message above are as follows:

Synthetic Sample 1

Subject: COvid-19 important notification
Body: We hope that you and your loved one are taking all the necessary precautions to stay safe and well during this Coronavirus (COVID-19) outbreak. As you know, the Corona virus outbreak is having an ever-growing impact on every aspect of our society, and that includes the ability of businesses to keep their doors open, our primary focus is to support you through this difficult time. There is an important update for all users <Credit Card Name> user to 39revents your account against fraud during the lock period, please kindly login to belows link to update your account.

Synthetic Sample 2

Subject: Covid-19 notification
Body: We hope that you and your loved ones are taking all the precautions to stay safe and well during this Coronavirus (COVID-19) outbreak. As you hear, the Corona virus outbreak is having an ever-growing impact on every aspect of our society, and it includes the ability of businesses to keep their doors open, our primary goal is to have you supported through this difficult time. This is an important update for all users <Credit Card Name> user to prevent your account against potential fraud during the lock period, please kindly login to below link to update your account.

Synthetic Sample 3

Subject: Covid-19 notification
Body: We hope that you are taking all the precautions to stay safe and well during this Coronavirus (COVID-19) outbreak. The Corona virus outbreak is having an ever-growing impact on every aspect of our society, and it includes the ability of businesses to keep their doors open, our primary goal is to have you supported through this difficult time. This is an important update for all users <Credit Card Name> user to prevent your account against potential fraud during the lock period, please kindly login to below link to update your account.

Synthetic Sample 4

Subject: Covid-19 notification
Body: We hope that you are taking all the precautions to stay safe and well during this Coronavirus (COVID-19) outbreak. This is an important update for all users <Credit Card Name> user to prevent your account against potential fraud during the lock period, please kindly login to below link to update your account. Please contact if you have further questions to 23984012

For the first synthetic sample, a portion of individual characters has been modified from the original (exemplar) sample to arrive at the synthetic sample (i.e., character level augmentation is used). For example, in the subject, the word "Covid-19" has been changed to "COvid-19" and in the body, "ever-growing" has been changed to "ever-growing." A human viewing the first synthetic sample might be as easily tricked into taking an action as one receiving the exemplar message (either not noticing the individual character errors, or dismissing them as minor typos). Further, some of the changes may not be readily perceptible to a human, particularly if a sans serif font is used to display the message. As one example, "taking all" in the exemplar is changed to "taking all" where the last character has been changed from a lower case "l" to the number "1." The perturbations are small (to a human), but the use of text augmentation can result in a sufficiently large and quality artificial training set that will improve a model's detection capabilities.

For the second synthetic sample, a portion of phrases has been modified from the original sample to arrive at the synthetic sample. Words can be omitted or inserted, and/or word/phrase synonyms can be used. For example, in the subject, the phrase "important information" has been changed to "notification." In the body, "necessary precautions" has been changed to "precautions," "our primary focus" has been changed to "our primary goal," etc.

The third synthetic sample can be generated using the second synthetic sample as input. Of note, various words present in the second sample are removed in the third sample (without additional changes being made). For example, "As you hear, the Corona" (in the second sample) becomes "The Corona" (in the third sample).

The fourth synthetic sample further reduces the words used in the second sample (e.g., removing the second sentence from the second sample entirely) and also inserts an additional sentence (asking that the recipient "contact if [they] have further questions").

Each of the synthetic samples can be programmatically/automatically generated by threat detection platform 100 and then used (at 1006) by training module 104 to either train/retrain a new type of model (e.g., a COVID-19 model that detects COVID-19 scams) or to improve detection performed by an existing model (e.g., a phishing model). Such training can be triggered manually (e.g., due to an immediate need to have a model that is capable of catching a novel attack), and can also be performed periodically (e.g., with threat detection platform 100 retraining several different types of models daily using applicable examples of the most currently available sources of confirmed safe (512) and confirmed attack (514) messages).

The resulting model can then be evaluated to confirm that it correctly identifies examples of the novel attack (low false negatives) without erroneously flagging benign messages (no/low false positives). The model can then be deployed for use in production by threat detection platform 100 (e.g., to catch subsequently sent COVID-19 phishing messages before they can cause harm).

VI. Example Processing System

Figure 11:
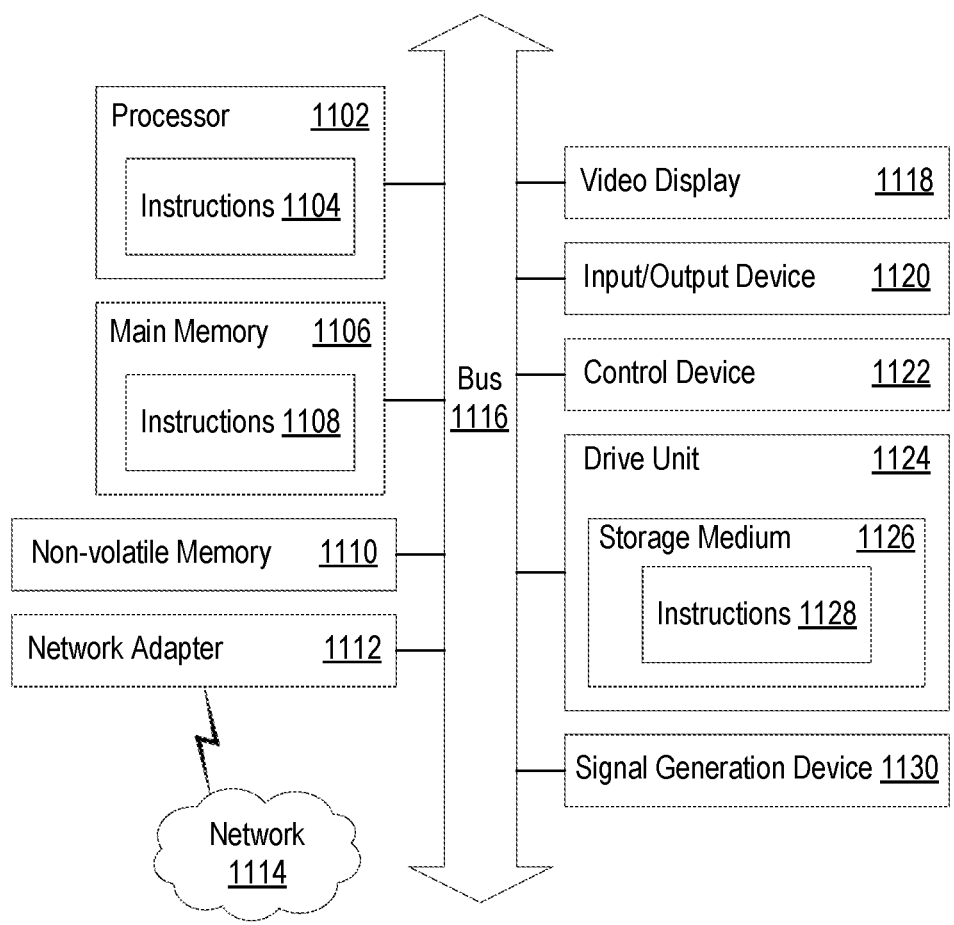
FIG. 11 is a block diagram illustrating an example of a processing system in which at least some operations described herein can be implemented.

FIG. 11 is a block diagram illustrating an example of a processing system 1100 in which at least some operations described herein can be implemented. For example, components of the processing system 1100 can be hosted on one or more electronic devices used to provide a threat detection platform (e.g., threat detection platform 100 of FIG. 1A).

Processing system 1100 includes a processor 1102, main memory 1106, non-volatile memory 1110, network adapter 1112, video display 1118, input/output device 1120, control device 1122 (e.g., a keyboard, pointing device, or mechanical input such as a button), drive unit 1124 that includes a storage medium 1126, and signal generation device 1130 that are communicatively connected to a bus 1116. Bus 1116 is illustrated as an abstraction that represents one or more physical buses and/or point-to-point connections that are connected by appropriate bridges, adapters, or controllers. Bus 1116, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I2C) bus, and/or a bus compliant with Institute of Electrical and Electronics Engineers (IEEE) Standard 1394, etc.

Processing system 1100 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1100.

While the main memory 1106, non-volatile memory 1110, and storage medium 1126 are shown to be a single medium, the terms "storage medium" and "machine-readable medium" should be taken to include a single medium or multiple media that store one or more sets of instructions 1128. The terms "storage medium" and "machine-readable medium" should also be taken to include any medium that is capable of storing, encoding, or carrying a set of instructions for execution by the processing system 1100. Further examples of machine- and computer-readable media include recordable-type media such as volatile and non-volatile memory devices 1110, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

In general, the routines executed to implement embodiments described herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memories and storage devices in an electronic device. When read and executed by the processor 1102, the instructions cause the processing system 1000 to perform operations to execute various aspects of techniques described herein.

Network adapter 1112 allows the processing system 1100 to mediate data in a network 1114 with an entity that is external to the processing system 1100 through any communication protocol supported by the processing system 1100 and the external entity. Examples of network adapter 1112 include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi), etc.

Techniques introduced herein can be implemented using software, firmware, hardware, or a combination of such forms. For example, various aspects can be implemented using special-purpose hardwired (i.e., non-programmable) circuitry in the form of application-specific integrated circuits (ASICs), programmable logic devices (PLDs), field-programmable gate arrays (FPGAs), and the like.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication that an existing natural language processing model, trained to classify textual content, should be retrained;
generate a set comprising a plurality of training samples, wherein the set includes at least one synthetic training sample constructed using one or more linguistic hints, comprising at least one keyword of phrase, about a particular novel attack for which malicious textual communications associated with the novel attack, when processed by the existing natural language processing model, are erroneously classified as benign textual communications;
retrain the existing natural language processing model at least in part by using the set of generated training samples; and
use the retrained model to determine a likelihood that a received communication transmitted by a sender to a recipient poses a risk; and
a memory coupled to the processor and configured to provide the processor with instructions.

2. The system of claim 1, wherein the indication is received in response to a report, by a recipient, of a malicious email.

3. The system of claim 1, wherein the indication is received in response to a specification of the novel attack.

4. The system of claim 1, wherein the indication includes an indication that a threshold quantity of false negatives is available for training purposes.

5. The system of claim 1, wherein generating the set of training samples includes performing a text augmentation on an exemplar malicious message.

6. The system of claim 5, wherein performing the text augmentation includes programmatically altering individual characters of the exemplar malicious message.

7. The system of claim 5, wherein performing the text augmentation includes programmatically altering one or more words of the exemplar malicious message.

8. The system of claim 5, wherein performing the text augmentation includes programmatically altering one or more clauses of the exemplar malicious message.

9. The system of claim 5, wherein performing the text augmentation includes replacing an element of the exemplar malicious message with a semantic equivalent.

10. The system of claim 9, wherein the semantic equivalent comprises a word synonym.

11. The system of claim 9, wherein the semantic equivalent comprises a phrase.

12. The system of claim 1, wherein generating the set of training samples includes modifying a predetermined amount of an exemplar malicious message.

13. The system of claim 1, wherein retraining the natural language processing model includes training a word-level convolutional neural network that predicts an attack label of an email.

14. The system of claim 1, wherein retraining the natural language processing model includes training a character-level convolutional neural network that predicts an attack label of an email.

15. The system of claim 1, further comprising taking a remedial action in response to determining that the received communication poses the risk.

16. The system of claim 1, wherein at least one hint is a reported false negative message.

17. The system of claim 1, wherein at least one hint is a sample attack message.

18. A method, comprising:
receiving an indication that an existing natural language processing model, trained to classify textual content, should be retrained;
generating a set comprising a plurality of training samples, wherein the set includes at least one synthetic training sample constructed using one or more linguistic hints, comprising at least one keyword or phrase, about a particular novel attack for which malicious textual communications associated with the novel attack, when processed by the existing natural language processing model, are erroneously classified as benign textual communications;
retraining the existing natural language processing model at least in part by using the set of generated training samples; and
using the retrained model to determine a likelihood that a received communication transmitted by a sender to a recipient poses a risk.

19. The method of claim 18, wherein the indication is received in response to a report, by a recipient, of a malicious email.

20. The method of claim 18, wherein the indication is received in response to a specification of the novel attack.

21. The method of claim 18, wherein the indication includes an indication that a threshold quantity of false negatives is available for training purposes.

22. The method of claim 18, wherein generating the set of training samples includes performing a text augmentation on an exemplar malicious message.

23. The method of claim 22, wherein performing the text augmentation includes programmatically altering individual characters of the exemplar malicious message.

24. The method of claim 22, wherein performing the text augmentation includes programmatically altering one or more words of the exemplar malicious message.

25. The method of claim 22, wherein performing the text augmentation includes programmatically altering one or more clauses of the exemplar malicious message.

26. The method of claim 22, wherein performing the text augmentation includes replacing an element of the exemplar malicious message with a semantic equivalent.

27. The method of claim 26, wherein the semantic equivalent comprises a word synonym.

28. The method of claim 26, wherein the semantic equivalent comprises a phrase.

29. The method of claim 18, wherein generating the set of training samples includes modifying a predetermined amount of an exemplar malicious message.

30. The method of claim 18, wherein retraining the natural language processing model includes training a word-level convolutional neural network that predicts an attack label of an email.

31. The method of claim 18, wherein retraining the natural language processing model includes training a character-level convolutional neural network that predicts an attack label of an email.

32. The method of claim 18, further comprising taking a remedial action in response to determining that the received communication poses the risk.

33. The method of claim 18, wherein at least one hint is a reported false negative message.

34. The method of claim 18, wherein at least one hint is a sample attack message.

* * * * *